US012553737B2

(12) United States Patent
Zhang

(10) Patent No.: US 12,553,737 B2
(45) Date of Patent: Feb. 17, 2026

(54) METHOD AND APPARATUS FOR NAVIGATION

(71) Applicant: Telefonaktiebolaget LM Ericsson (PUBL), Stockholm (SE)

(72) Inventor: Ning Zhang, Beijing (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 96 days.

(21) Appl. No.: 17/770,465

(22) PCT Filed: Oct. 22, 2019

(86) PCT No.: PCT/CN2019/112592
§ 371 (c)(1),
(2) Date: Apr. 20, 2022

(87) PCT Pub. No.: WO2021/077302
PCT Pub. Date: Apr. 29, 2021

(65) Prior Publication Data
US 2022/0373350 A1 Nov. 24, 2022

(51) Int. Cl.
*G01C 21/36* (2006.01)
(52) U.S. Cl.
CPC ............... *G01C 21/3652* (2013.01)
(58) Field of Classification Search
CPC ............ G01C 21/3652; G01C 21/3461; G01C 21/3697; H04W 4/024
See application file for complete search history.

(56) References Cited

U.S. PATENT DOCUMENTS

| 9,031,779 | B2 * | 5/2015 | Djugash | G08G 1/0141 |
| | | | | 701/425 |
| 10,360,907 | B2 * | 7/2019 | Dayal | G01C 21/3629 |
| 10,809,079 | B2 * | 10/2020 | Bell | G01C 21/3652 |
| 2005/0267681 | A1 | 12/2005 | Yato | |
| 2015/0324646 | A1 * | 11/2015 | Kimia | G06T 7/80 |
| | | | | 348/62 |

(Continued)

FOREIGN PATENT DOCUMENTS

| CN | 106027668 A | 10/2016 |
| CN | 107221197 A | 9/2017 |
| CN | 207055102 U | 3/2018 |

(Continued)

OTHER PUBLICATIONS

Paredes, H. et al. "Exploring Smart Environments Through Human Computation for Enhancing Blind Navigation", 2015 (Year: 2015).*

(Continued)

*Primary Examiner* — Anne Marie Antonucci
*Assistant Examiner* — Misa H Nguyen
(74) *Attorney, Agent, or Firm* — Baker Botts L.L.P.

(57) ABSTRACT

Embodiments of the present disclosure provide methods and apparatuses for navigation. A method performed by a communication device comprises obtaining a current position of an object. The method further comprises determining whether the object is dangerous to a user of a terminal device based on the current position of the object. The method further comprises, in response to a positive determination, sending a message for guiding the user to a first wearable device of the user and/or a message for informing a maintainer about the dangerous object.

19 Claims, 15 Drawing Sheets

(56) References Cited

U.S. PATENT DOCUMENTS

2016/0210834 A1 7/2016 Dayal
2021/0049908 A1* 2/2021 Pipe .................... G08G 1/0112

FOREIGN PATENT DOCUMENTS

| CN | 109785633 A | 5/2019 |
| CN | 109828514 A | 5/2019 |
| GB | 2568138 A1 | 5/2019 |
| WO | 2019087186 A1 | 5/2019 |

OTHER PUBLICATIONS

PCT Notification of Transmittal of the International Search Report and the Written Opinion of the International Searching Authority, or the Declaration issued for International application No. PCT/CN2019/112592—Jul. 8, 2020.
Extended European Search Report issued for Application No. / Patent No. 19949972.4-1009 / 4048980 PCT/CN2019112592—Jul. 7, 2023.
Notice of First Review issued for Chinese Patent Application Serial No. 201980101564.5—Oct. 17, 2024.

* cited by examiner

300 ⎯⎯

302

Receiving a message for confirming or denying that the object is dangerous to the user of the terminal device from a second wearable device

304

Sending the message for confirming or denying that the object is dangerous to the user of the terminal device to a server

METHOD AND APPARATUS FOR NAVIGATION

PRIORITY

This nonprovisional application is a U.S. National Stage Filing under 35 U.S.C. § 371 of International Patent Application Serial No. PCT/CN2019/112592 filed Oct. 22, 2019 and entitled "METHOD AND APPARATUS FOR NAVIGATION" which is hereby incorporated by reference in its entirety.

TECHNICAL FIELD

The non-limiting and exemplary embodiments of the present disclosure generally relate to the technical field of communications, and specifically to methods and apparatuses for navigation.

BACKGROUND

This section introduces aspects that may facilitate a better understanding of the disclosure. Accordingly, the statements of this section are to be read in this light and are not to be understood as admissions about what is in the prior art or what is not in the prior art.

There are various navigation solutions such as vehicle navigation, pedestrian navigation, etc. The navigation can be handled and processed by various devices such as mobile devices (e.g., mobile phones, pads and laptops), vehicle equipment, etc. For example, vehicle and/or mobile device manufacturers can offer pre-installed navigation systems as standard or optional components. Moreover, drivers and/or users that want to add a navigation system or application to their existing vehicle and/or mobile device can choose among numerous navigation systems or applications. The navigation may be convenient in some cases, for example, when the user is travelling in an unfamiliar and/or dangerous area. For example, a voice style and/or route preference can be adapted with dedicated users. The navigation system or application can prompt the user paying attention to potential risk factors.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

As described above, the navigation may be convenient in some cases, however the existing navigation solutions may have some issues. For example, it is hard to navigate in bad environments such as bad weather (cold winter, raining, snowing, strong wind, etc.), noisy place, etc. As an example, a lithium battery may not work at a low temperature when a user takes a mobile device with the lithium battery out of his/her bag or pocket. The user may feel hostile when he/she has to operate an electronic device by taking off his/her gloves in cold winter. The device itself may stop working due to that the lithium battery could not work in a low temperature environment. When the road is snow covered, it is dangerous for the user to walk on the road where it is hard to see the accurate position of a crossroad and the boundary of sidewalk. The user may feel bad when he/she has to operate a device in a rain day or a snow day or a strong wind day, etc. The user may hardly hear the navigation voice on noisy streets or having hearing impairment. The navigation system (e.g., software and/or hardware) usually consumes much battery power, and when the navigation system is suffering low battery, the navigation may have to be given up. Moreover, below issues might affect the user experience: some voice prompt such as the voice prompt of "the road section ahead is accident-prone" is somehow meaningless, and the user may expect more dedicated or even customized pre-cautions of risk factors. Most exiting navigation systems cannot prompt a user (such as a pedestrian or a driver) with risk factors even though he/she is mostly exposed to dangers, e.g., a road section is snow covered but still under construction.

To overcome or mitigate at least one of the above mentioned problems or other problems, embodiments of the present disclosure propose an improved navigation solution.

In a first aspect of the disclosure, there is provided a method performed by a communication device. The method comprises obtaining a current position of an object. The method further comprises determining whether the object is dangerous to a user of a terminal device based at least on the current position of the object. The method further comprises, in response to a positive determination, sending a message for guiding the user to a first wearable device of the user and/or a message for informing a maintainer about the dangerous object.

In an embodiment, the method may further comprise obtaining an initial position of the object and/or material information of the object. Determining whether the object is dangerous to the user of the terminal device is further based on the initial position and/or the material information of the object.

In an embodiment, the initial position and/or the current position of the object and/or the material information of the object may be obtained from a server.

In an embodiment, the method may further comprise obtaining a navigation route of the user, wherein the object is related to the navigation route.

In an embodiment, sending the message for guiding the user may be performed when a distance between the terminal device and the object is smaller than a threshold.

In an embodiment, the method may further comprise receiving a message for confirming or denying that the object is dangerous to the user of the terminal device from a second wearable device. The method may further comprise sending the message for confirming or denying that the object is dangerous to the user of the terminal device to a server.

In an embodiment, the second wearable device may comprise at least one tactile input sensor.

In an embodiment, the at least one tactile input sensor may be built in a backpack or a handbag.

In an embodiment, the first wearable device may comprise at least one vibrator.

In an embodiment, the at least one vibrator may be built in a backpack or a handbag.

In an embodiment, the object may have at least one built-in Internet of things, IoT, device.

In an embodiment, the object may comprise at least one of a municipal infrastructure or a natural stuff.

In an embodiment, the communication device may be a terminal device or a server.

In a second aspect of the disclosure, there is provided a method performed by a server. The method comprises obtaining a current position of an object. The method further comprises sending the current position of the object to a terminal device. The current position of the object is used to determine whether the object is dangerous to a user of the terminal device.

In an embodiment, the method may further comprise obtaining an initial position of the object and/or material information of the object. The method may further comprise sending the initial position of the object and/or material information of the object to the terminal device. The initial position of the object and/or the material information of the object may be used to determine whether the object is dangerous to the user of the terminal device.

In an embodiment, the initial position and the current position of the object may be obtained from the object's Internet of things, IoT, device.

In an embodiment, the method may further comprise receiving a message for confirming or denying that the object is dangerous to the user of the terminal device from the terminal device. The method may further comprise marking the object based on the message.

In a third aspect of the disclosure, there is provided a method performed by a first wearable device. The method comprises receiving a message for guiding a user from a terminal device of the user. The method further comprises guiding the user based on the message. An object is determined to be dangerous to the user of the terminal device based at least on a current position of the object.

In an embodiment, the object is determined to be dangerous to the user of the terminal device further based on an initial position of the object and/or material information of the object.

In an embodiment, receiving the message for guiding the user may be performed when a distance between the terminal device and the object is smaller than a threshold.

In a fourth aspect of the disclosure, there is provided a method performed by a second wearable device. The method comprises receiving an input for confirming or denying that an object is dangerous to a user of a terminal device from the user. The method further comprises sending a message for confirming or denying that the object is dangerous to the user of the terminal device to the terminal device. The object is determined to be dangerous to the user of the terminal device based at least on a current position of the object.

In a fifth aspect of the disclosure, there is provided a method performed by an object. The method comprises obtaining a current position of the object. The method further comprises sending the current position of the object to a server. The current position of the object is used to determine whether the object is dangerous to a user of a terminal device.

In an embodiment, the method may further comprise obtaining an initial position of the object. The method may further comprise sending the initial position of the object to the server. The initial position and the current position are used to determine whether the object is dangerous to the user of the terminal device.

In another aspect of the disclosure, there is provided a communication device. The communication device comprises a processor; and a memory coupled to the processor, said memory containing instructions executable by said processor, whereby said communication device is operative to obtain a current position of an object. Said communication device is further operative to determine whether the object is dangerous to a user of the terminal device based at least on the current position of the object. Said communication device is further operative to, in response to a positive determination, send a message for guiding the user to a first wearable device of the user and/or a message for informing a maintainer about the dangerous object.

In another aspect of the disclosure, there is provided a server. The server comprises a processor; and a memory coupled to the processor, said memory containing instructions executable by said processor, whereby said server is operative to obtain a current position of an object. Said server is operative to send the current position of the object to a terminal device. The current position of the object is used to determine whether the object is dangerous to a user of the terminal device.

In another aspect of the disclosure, there is provided a first wearable device. The first wearable device comprises a processor; and a memory coupled to the processor, said memory containing instructions executable by said processor, whereby said first wearable device is operative to receive a message for guiding a user from a terminal device of the user. Said first wearable device is operative to guide the user based on the message. An object is determined to be dangerous to the user of the terminal device based at least on a current position of the object In another aspect of the disclosure, there is provided a second wearable device. The second wearable device comprises a processor; and a memory coupled to the processor, said memory containing instructions executable by said processor, whereby said second wearable device is operative to receive an input for confirming or denying that an object is dangerous to a user of a terminal device from the user. Said second wearable device is operative to send a message for confirming or denying that the object is dangerous to the user of the terminal device to the terminal device. The object is determined to be dangerous to the user of the terminal device based at least on a current position of the object.

In another aspect of the disclosure, there is provided an apparatus at an object. The apparatus comprises a processor; and a memory coupled to the processor, said memory containing instructions executable by said processor, whereby said apparatus is operative to obtain a current position of the object. Said apparatus is operative to send the current position of the object to a server. The current position of the object is used to determine whether the object is dangerous to a user of a terminal device.

In another aspect of the disclosure, there is provided a communication device. The communication device comprises an obtaining module, a determining module and a sending module. The obtaining module may be configured to obtain a current position of an object. The determining module may be configured to determine whether the object is dangerous to a user of the terminal device based at least on the current position of the object. The sending module may be configured to, in response to a positive determination, send a message for guiding the user to a first wearable device of the user.

In another aspect of the disclosure, there is provided a server. The server comprises an obtaining module and a sending module. The obtaining module may be configured to obtain a current position of an object. The sending module may be configured to send the current position of the object to a terminal device. The current position of the object is used to determine whether the object is dangerous to a user of the terminal device.

In another aspect of the disclosure, there is provided a first wearable device. The first wearable device comprises a receiving module and a guiding module. The receiving module may be configured to receive a message for guiding a user from a terminal device of the user. The guiding module may be configured to guide the user based on the message. An object is determined to be dangerous to the user of the terminal device based at least on a current position of the object.

In another aspect of the disclosure, there is provided a second wearable device. The second wearable device comprises a receiving module and a sending module. The receiving module may be configured to receive an input for confirming or denying that an object is dangerous to a user of a terminal device from the user. The sending module may be configured to send a message for confirming or denying that the object is dangerous to the user of the terminal device to the terminal device. An object is determined to be dangerous to the user of the terminal device based at least on a current position of the object.

In another aspect of the disclosure, there is provided an object. The object comprises an obtaining module and a sending module. The obtaining module may be configured to obtain a current position of the object. The sending module may be configured to send the current position of the object to a server. The current position of the object is used to determine whether the object is dangerous to a user of a terminal device.

Embodiments herein afford many advantages, of which a non-exhaustive list of examples follows. Some embodiments herein may bring much convenience when the user is travelling (especially by foot) in tough areas, under cold seasons or in bad weathers. Some embodiments herein may avoid the user to be exposed to dangers. In some embodiments herein, the user can also feedback his/her observations to the communication device such as the server so that other people could also get benefits. In some embodiments herein, the hardware implementation for individual people is cheap, for example, the wearable device can be built-in almost all existing backpacks and handbags, the user won't feel a big change to his/her habits, and the software can be upgraded via the user's mobile devices such as phones, so it is easy to launch in markets for customers. In some embodiments herein, when the wearable device such as bag is lost, the police may find the owner of the bag more easily by analyzing the route travelled and stored in the internal storage within the wearable device. In some embodiments herein, the user can just use the wearable device such as sensor (including gyro and pressure sensitive sensor) to input messages to the terminal device without carrying out it from a pocket or a bag. This brings much more convenience in bad weather such as cold, raining or snowing. In some embodiments herein, it can make the blind and dumb people to input messages. In some embodiments herein, the navigation can be run without a screen, for example just by vibrations, this is useful to save batteries as the existing navigation software is always the huge power consumer. In some embodiments herein, the NB-IoT devices are installed in at least one facility along a road, and it is possible to do navigations even if the road is snow-covered, especially when it is under construction and/or or ruined or suffered malicious destruction. In some embodiments herein, it can help blind and hearing impairment people to walk more safely along the road as a relevant cheap solution comparing with the VR (virtual reality) glasses or AR (augmented reality) glasses. In some embodiments herein, the VR or AR glasses can be an optional component which may bring more convenience user experience. In some embodiments herein, people may always carry a backpack or a handbag with the wearable device when they are outing, so it won't increase the user's load. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
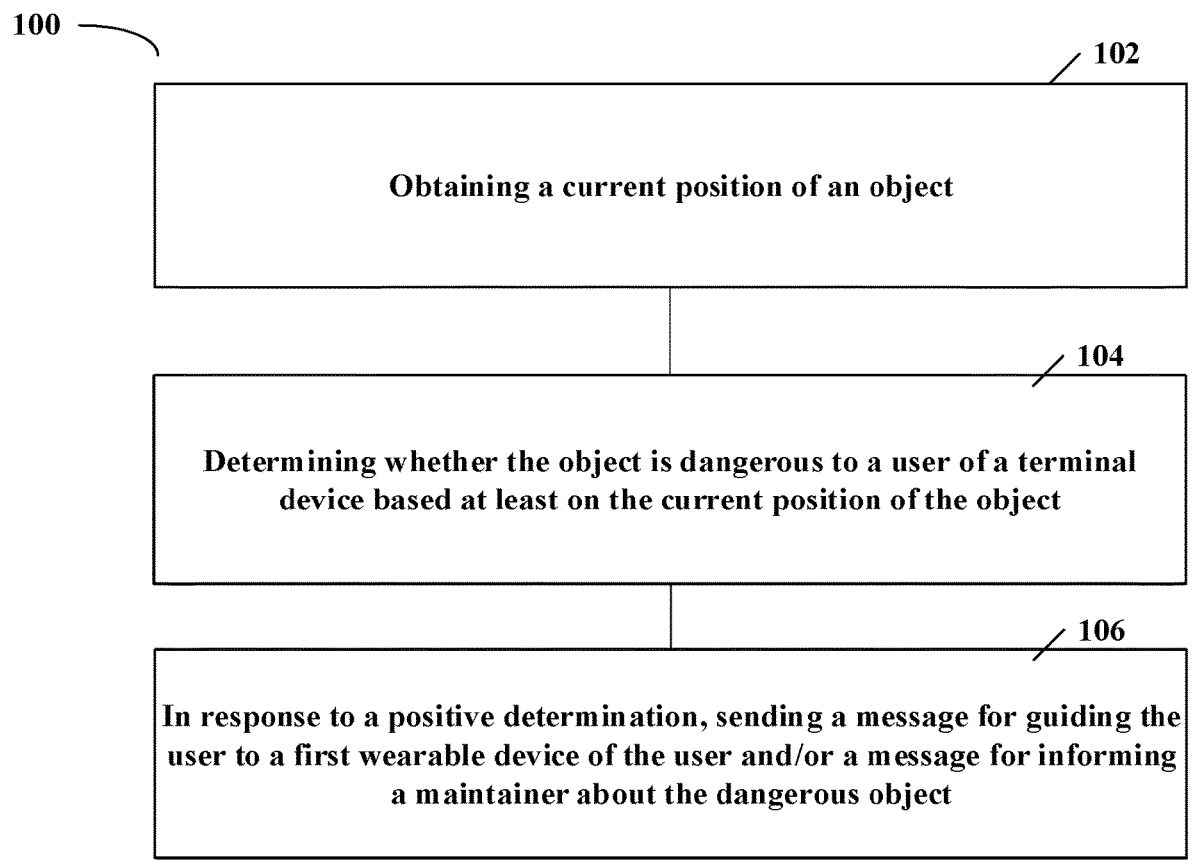
FIG. 1 shows a flowchart of a method according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards such as new radio, long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols as may comprise the first generation (1G), 2G, 3G, 4G, 4.5G, 5G communication protocols, and/or any other protocols either currently known or to be developed in the future.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IoT) scenario, a terminal device may represent a machine or other device that can perform monitoring and/or measurements, and transmit the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

FIG. 1 shows a flowchart of a method 100 according to an embodiment of the present disclosure, which may be performed by an apparatus implemented in or as or communicatively coupled to a communication device (such as terminal device or server) or any other entity having similar functionality. As such, the communication device may provide means or modules for accomplishing various parts of the method 100 as well as means or modules for accomplishing other processes in conjunction with other components.

At block 102, the communication device may obtain a current position of an object. The object may be any suitable object in a navigation scenario, such as infrastructure (e.g., municipal infrastructure), natural stuff, vehicle, ship, boat, vessel, car, pedestrian, train, tree, drainage ditch, manhole cover, misaligned brick, road section under constructions, etc. The communication device may obtain the current position of the object in various ways. As a first example, when the communication device is the terminal device, it may obtain the current position of the object from the object via various short-range wireless communication techniques such as device-to-device (D2D) communication, WIFI (wireless fidelity), WLAN (wireless local area network), Zigbee, Bluetooth, UWB (Ultra Wide Band), RFID (Radio Frequency Identification), etc. As a second example, when the communication device is the terminal device, it may obtain the current position of the object from a server via a communication network such as various cellular communication networks. In this case, the server may maintain various position information of various objects. As a third example, when the communication device is the server, it may obtain the current position of an object from the terminal device or an IoT device of the object.

When the communication device is the terminal device, the terminal device may obtain the current position of the object actively or passively. For example, when the terminal device obtains the current position of the object actively, it may send a request to another device such as the object and/or the server to obtain the current position of the object. When the terminal device obtains the current position of the object passively, another device such as the object and/or the server may send or push the current position of the object to the terminal device actively.

The communication device may obtain the current position of the object when a predefined condition is fulfilled. For example, when a predefined condition is fulfilled, e.g., when the distance between the object and the terminal device is smaller than a predefined threshold, and/or when the object is on the route of a navigation path, etc., the communication device may obtain the current position of the object.

At block 104, the communication device may determine whether the object is dangerous to a user of the terminal device based at least on the current position of the object. For example, when the current position of the object is dangerous to the user of the terminal device, e.g., the user may fall down, be injured, be frightened or an accident may occur, the communication device may determine that the current position of the object is dangerous to the user of the terminal device. In addition, the communication device may determine whether the object is dangerous to the user of the terminal device based on an initial position and at least one other factor such as an initial position of the object. The initial position of an object may be a position where the object is supposed to be as designed or according to e.g. an original installing, manufacturing, or constructing plan.

At block 106, the communication device may, in response to a positive determination (i.e., the current position of the object is dangerous to the user of the terminal device), send a message for guiding the user to a first wearable device of the user and/or a message for informing a maintainer about the dangerous object. The first wearable device may be any suitable wearable device which can send any suitable signal to guide the user. For example, the first wearable device may comprise at least one of a vibrator, VR glasses, AR glasses, a smart watch, a smart bracelet, a smart wristband, a smart backpack, a smart handbag, a headset etc. The first wearable device may be worn in any suitable location of the body of the user. When the communication device is the terminal device, it may send the message for guiding the user to the first wearable device of the user via various short range communication techniques such as Bluetooth, etc. When the communication device is the server, it may send the message for guiding the user to the first wearable device of the user via the terminal device.

In an embodiment, the first wearable device may comprise at least one vibrator. The at least one vibrator can be built in any other objects such as a backpack or a handbag, a wristband, a neckband, a bandage, a steering wheel of a car, in a part of a motorcycle, in a part of a bicycle, in a part of a ski, in clothes, such as gloves, shoes, a hat, a helmet, a pullover, into a scarf and/or into a shoe.

In an embodiment, the at least one vibrator is built in a backpack or a handbag. For example, the at least one vibrator may comprise two vibrators which can be planted in the bag such as backpack or handbag in below criteria: the space between the two vibrators may be big enough so that the user can distinguish their vibrations. The position of the two vibrators may be close to the human body so that the user can feel the vibration especially in bad weather such as cold seasons when the user always wear thick clothes. The two vibrators can be powered by lithium battery which may be placed near the human body so that the lithium battery won't suffer too much under low temperature.

The navigation function can be implemented by the first wearable device, such as two vibrators planted in different belts in backpack or the belt and the back side of a handbag. For example, when the navigation is running, the communication device may guide the user to turn left or right by invoke vibrations of a vibrator in the left or right belt so it is easily for the user to understand which direction should turn. When the two vibrators is built in a handbag, the user can define which vibrator indicates to turn left or right, and the other vibrator may stand for the other direction. In addition, the vibration pattern can be customized for various purposes such as remind the user to turn, remind the user the road ahead might be dangerous for some reasons, etc.

The message for guiding the user may instruct the first wearable device to provide various signals (such as vibration signal, video signal, audio signal, etc., and/or any combination thereof) to the user of the first wearable device.

The message for informing a maintainer about the dangerous object may be used to inform a maintenance team to repair the dangerous object. This message may be sent to the server which will forward it to the maintainer or sent by the IoT device of the object to the maintainer.

In an embodiment, the communication device may send the message for guiding the user to the first wearable device of the user when a distance between the terminal device and the object is smaller than a threshold. The communication device may obtain terminal device's location by using various positioning technologies.

Figure 2:
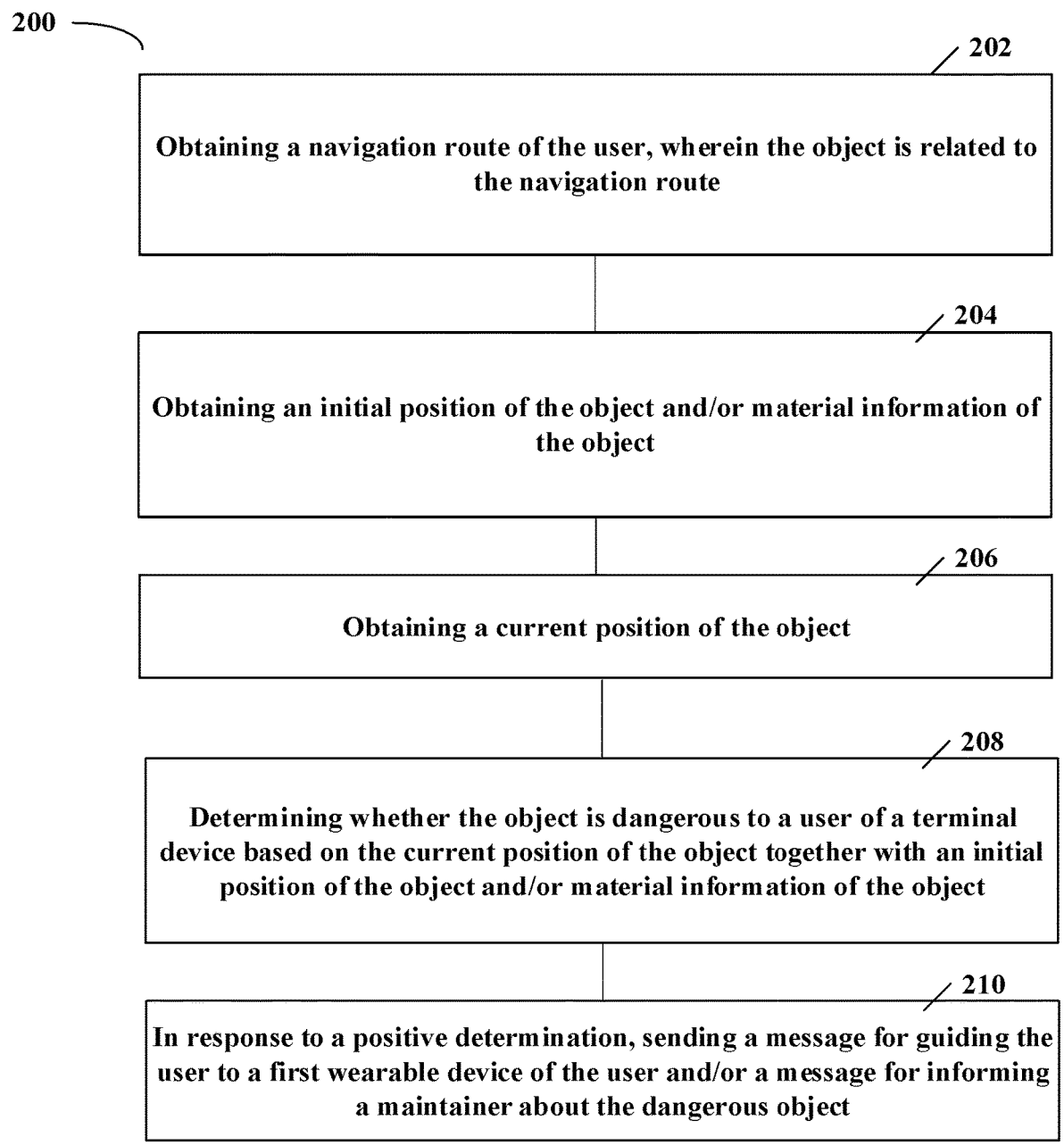
FIG. 2 shows a flowchart of a method according to another embodiment of the present disclosure.

FIG. 2 shows a flowchart of a method 200 according to another embodiment of the present disclosure, which may be performed by an apparatus implemented in or as or communicatively coupled to a communication device (such as a terminal device or server) or any other entity having similar functionality. As such, the communication device may provide means or module for accomplishing various parts of the method 200 as well as means for accomplishing other processes in conjunction with other components. For some parts which have been described in the above embodiments, detailed description thereof is omitted here for brevity.

At block 202, the communication device may obtain a navigation route of the user. The object is related to the navigation route. For example, the communication device may be a navigation device or running a navigation application, and when the user has selected a navigation route, then the communication device may obtain the user's navigation route. As another example, when the user has deviated from the current navigation route and/or a new navigation route is selected by the user or the communication device, then the communication device may obtain the new navigation route which will replace the current navigation route.

At block 204, the communication device may obtain an initial position of the object and/or material information of the object. The initial position and/or the material information of the object may be configured by an owner of the object or obtained from the object. For example, when the object is a municipal infrastructure such as a manhole cover, the initial position of the manhole cover may be configured by the owner of the manhole cover or obtained from an IoT device of the manhole cover when the manhole cover is installed. The communication device may obtain the initial position of the object from a server via a communication network such as various communication networks. In this case, the server may maintain various position information of various objects. In addition, when the initial position of the object has been stored in the communication device, e.g., the communication device has stored various map information with the initial position information of various objects, the communication device may obtain the initial position of the object locally.

At block 206, the communication device may obtain the current position of the object. Block 206 is similar to block 102 of FIG. 1.

In an embodiment, the initial position of the object and/or the current position of the object and/or material information of the object may be obtained from a server. For example, the server may maintain various position information (such as initial position and/or the current position) of various objects, and then the initial position and/or the current position of the object may be obtained from the server.

At block 208, the communication device may determine whether the object is dangerous to a user of the terminal device based on the current position of the object together with the initial position of the object and/or the material information of the object. For example, when the difference between the current position and the initial position is larger than a predefined threshold, the communication device may determine that the object is dangerous to the user of the terminal device. For different objects, the predefined threshold may be same or different. Different materials may lead to various vulnerability level when the object is moving and displacement. Thus, the material of the object may also be considered to determine whether the object is dangerous to the user of the terminal device.

At block 210, the communication device may, in response to a positive determination, send the message for guiding the user to the first wearable device of the user and/or a message for informing a maintainer about the dangerous object. Block 210 is similar to block 106 of FIG. 1.

Figures 3, 4:
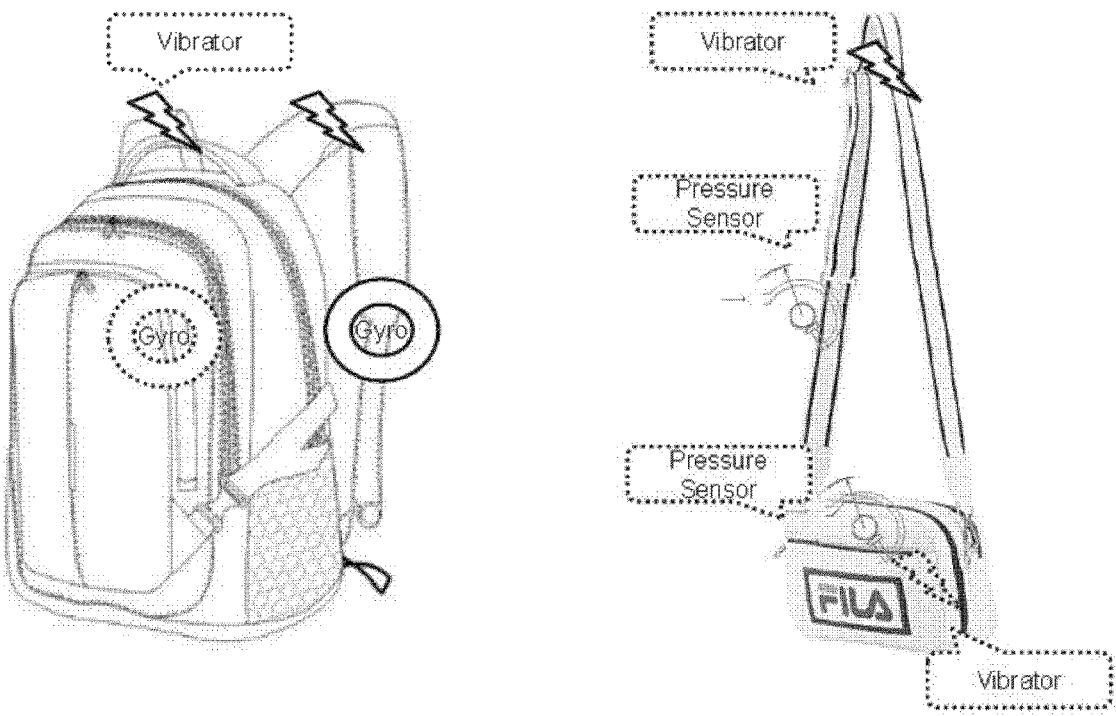
FIG. 3 shows a flowchart of a method according to another embodiment of the present disclosure.
FIG. 4 schematically shows a backpack and a handbag both of which have built-in wearable devices.

FIG. 3 shows a flowchart of a method 300 according to another embodiment of the present disclosure, which may be performed by an apparatus implemented in or as or communicatively coupled to a communication device (such as a terminal device or a server) or any other entity having similar functionality. As such, the communication device may provide means or module for accomplishing various parts of the method 300 as well as means for accomplishing other processes in conjunction with other components. For some parts which have been described in the above embodiments, detailed description thereof is omitted here for brevity.

At block 302, the communication device may receive a message for confirming or denying that the object is dangerous to the user of the terminal device from a second wearable device. The second wearable device may be any suitable input device such as tactile input sensor. Said suitable input device can be built in any other objects such as a backpack or a handbag, a wristband, a neckband, a bandage, a steering wheel of a car, in a part of a motorcycle, in a part of a bicycle, in a part of a ski, in clothes, such as gloves, shoes, a hat, a helmet, a pullover, into a scarf and/or into a shoe. In an embodiment, the second wearable device may comprise at least one tactile input sensor such as a gyro, a pressure sensitive sensor, etc. For example, the second wearable device may comprise two sensors (gyro or pressure sensitive sensor) which can be planted in the bag such as backpack or handbag in below criteria: the space between the two sensors and the space between the two sensors and the vibrators (described above) may be big enough that the human user won't mix them and/or the vibrations would not introduce noise signals. The position of the two sensors may be on the other side of the bag so that limited noise signals would be introduced. The second wearable device can be powered by lithium battery which placed near the human body so that it won't be suffered too much under low temperature. The second wearable device can get the user's tactile input. For example, the second wearable device can accept a certain pattern for below reasons: confirming the danger or marking the danger as a "false alarm". In an embodiment, when the communication device is the terminal device, it may receive the message for confirming or denying that the object is dangerous to the user of the terminal device from the second wearable device via various short range communication techniques such as Bluetooth, etc. In another embodiment, when the communication device is the server, it may receive the message for confirming or denying that the object is dangerous to the user of the terminal device from the second wearable device via the terminal device.

At block 304, the communication device may send the message for confirming or denying that the object is dangerous to the user of the terminal device to the server. For example, the server (such as cloud sever) may be implemented in below architecture. The storage of the server may store all objects (such as infrastructure) status (such as various position information) and keep them up-to-date. Based on the position information, the server can analyze all kinds of dangerous factors and transfer the dangerous factor information to the communication device. The storage of the server may store the user's feedback on these factors, such as whether it is really a dangerous factor or just a false alarm, a severity level of the factor, the user reported factor, the algorithm for the user to avoid the factor. It is noted that when the communication device and the server is the same entity, then block 304 may be omitted.

In various embodiments, when the communication device is the server, the terminal device may be installed with a navigation software which will bridge the communication between the wearable devices and the server.

In various embodiments, the object may have at least one built-in IoT device. The IoT device may provide various position information related to the object to the communication device.

FIG. 4 schematically shows a backpack and a handbag both of which have built-in wearable devices. As shown in FIG. 4, there are two vibrators built in the bag. If the bag has two belts, then there may be a vibrator built in for each side. If the bag only has one belt, then one vibrator may be installed in the place where the bag is carried by the user's shoulder and the other one may be installed in the side of this bag which near to the user's body. Moreover there are two sensors (gyro or pressure sensor) built in the bag to get the user's tactile input. It is noted that the positions and number of the wearable devices as shown in FIG. 4 are only for the purpose of illustration, and they may be different in other embodiments.

Figure 5:
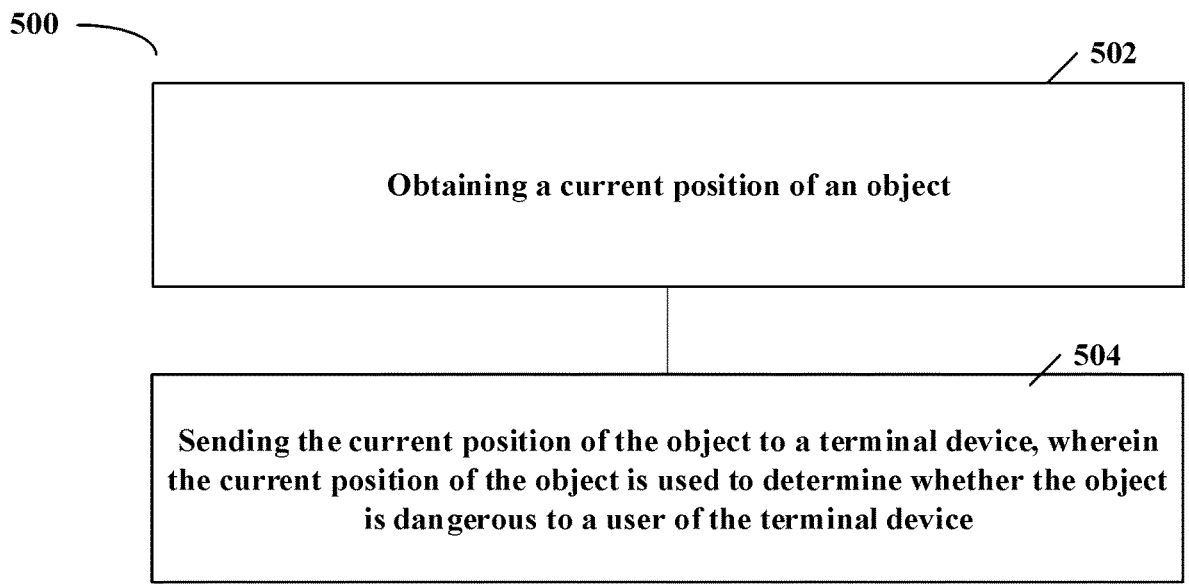
FIG. 5 shows a flowchart of a method according to another embodiment of the present disclosure.

FIG. 5 shows a flowchart of a method 500 according to another embodiment of the present disclosure, which may be performed by an apparatus implemented in or as or communicatively coupled to a server or any other entity having similar functionality. As such, the server may provide means or module for accomplishing various parts of the method 500 as well as means for accomplishing other processes in conjunction with other components. For some parts which have been described in the above embodiments, detailed description thereof is omitted here for brevity.

At block 502, the server may obtain a current position of an object. For example, the server may obtain the current position of the object from an IoT device of the object or from another device that has stored the current position information of the object.

At block 504, the server may send the current position of the object to a terminal device. The server may send the current position of the object to the terminal device actively or passively. For example, when the server receives a request for obtaining the current position of the object, it may send the current position of the object to the terminal device. When a predefined condition is fulfilled, e.g., when the distance between the object and the terminal device is smaller than a predefined threshold and/or when the object is on a navigation route, etc., the communication device may send the current position of the object to the terminal device. In an embodiment, the current position of the object may be used to determine whether the object is dangerous to a user of the terminal device as described above.

Figure 6:
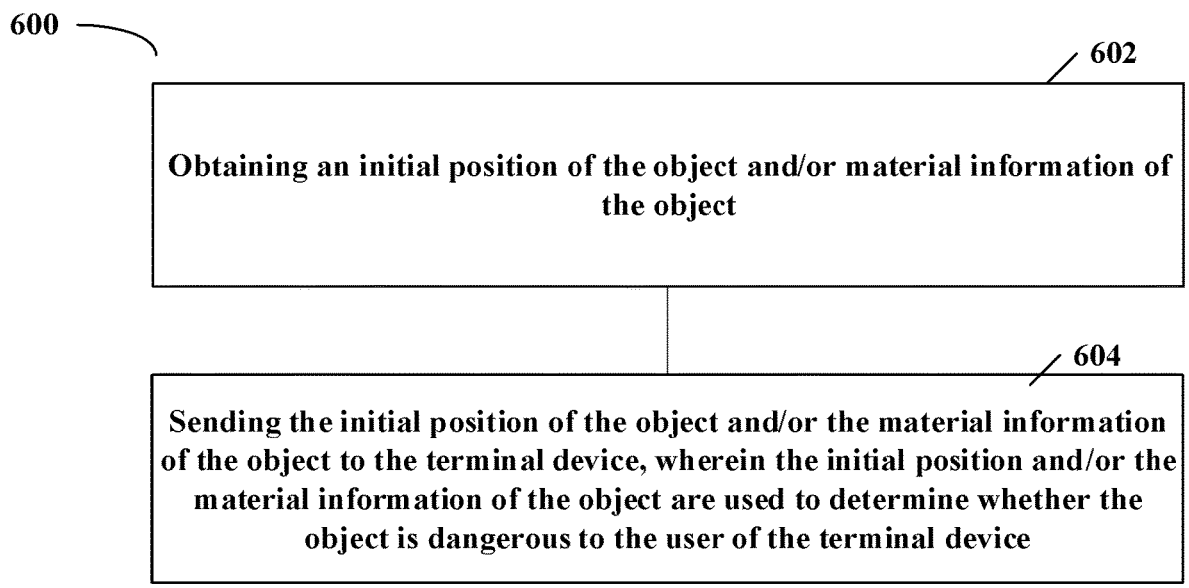
FIG. 6 shows a flowchart of a method according to another embodiment of the present disclosure.

FIG. 6 shows a flowchart of a method 600 according to another embodiment of the present disclosure, which may be performed by an apparatus implemented in or as or communicatively coupled to a server or any other entity having similar functionality. As such, the server may provide means or module for accomplishing various parts of the method 600 as well as means for accomplishing other processes in conjunction with other components. For some parts which have been described in the above embodiments, detailed description thereof is omitted here for brevity.

At block 602, the server may obtain an initial position of the object and/or material information of the object. For example, the server may obtain the initial position of the object and/or material information of the object from an IoT device of the object or from another device that has stored the initial position information of the object and/or material information of the object.

At block 604, the server may send the initial position of the object and/or material information of the object to the terminal device. The server may send the initial position of the object and/or material information of the object to the terminal device actively or passively. For example, when the server receives a request for obtaining the initial position of the object and/or material information of the object, it may send the initial position of the object and/or material information of the object to the terminal device. When a predefined condition is fulfilled, e.g., when the distance between the object and the terminal device is smaller than a predefined threshold, and/or when the object is on a navigation route, etc., the communication device may send the initial position of the object and/or material information of the object to the terminal device. In an embodiment, the initial position of the object and/or material information of the object may be used to determine whether the object is dangerous to a user of the terminal device as described above.

Figure 7:
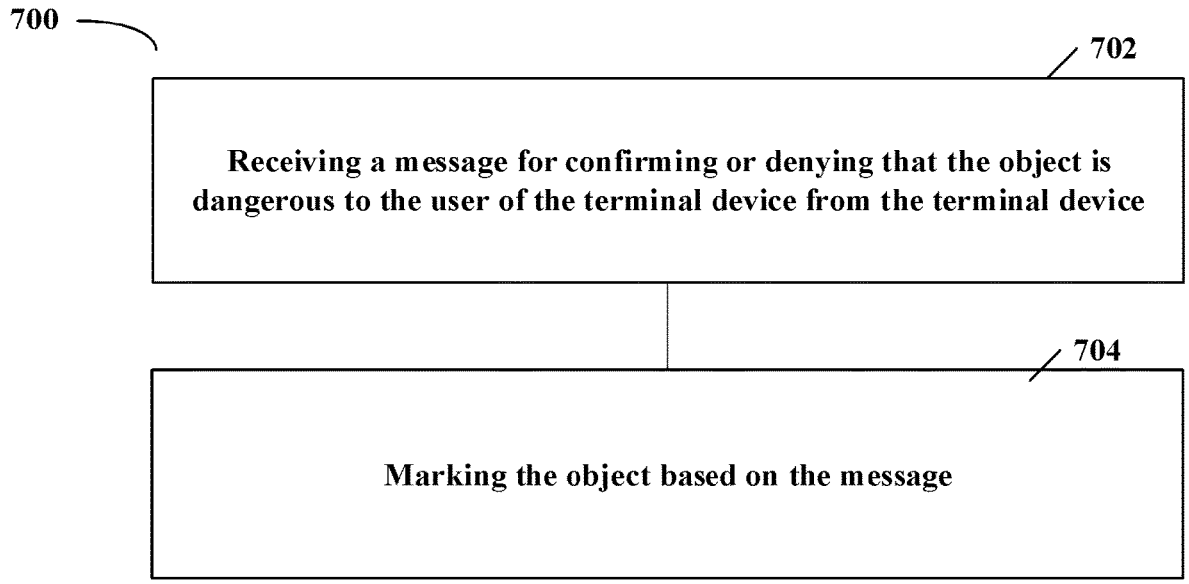
FIG. 7 shows a flowchart of a method according to another embodiment of the present disclosure.

FIG. 7 shows a flowchart of a method 700 according to another embodiment of the present disclosure, which may be performed by an apparatus implemented in or as or communicatively coupled to a server or any other entity having similar functionality. As such, the server may provide means or module for accomplishing various parts of the method 700 as well as means for accomplishing other processes in conjunction with other components. For some parts which have been described in the above embodiments, detailed description thereof is omitted here for brevity.

At block 702, the server may receive a message for confirming or denying that the object is dangerous to the user of the terminal device from the terminal device. For example, the communication device such as terminal device may send this message to the server at block 304 of FIG. 3, and then the server may receive this message.

At block 704, the server may mark the object based on the message. For example, when the server receives a predefined number of messages for confirming the dangerous object, the server may mark the object as an identified danger. When the server receives a certain number of messages for denying the dangerous object, the server may mark the danger as an false alarm.

Figure 8:
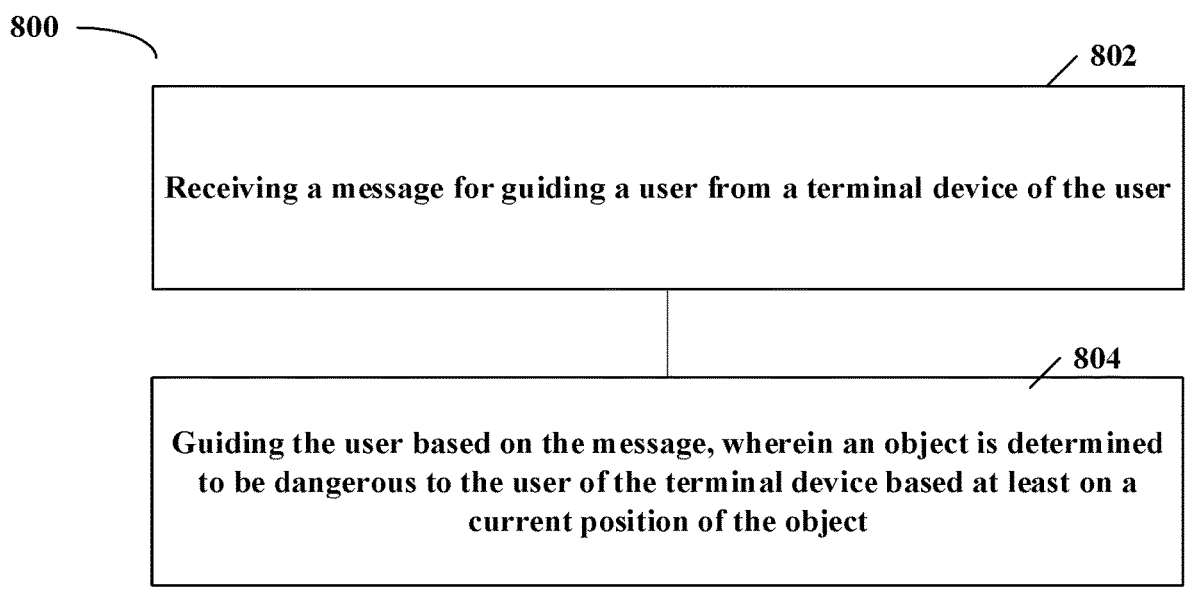
FIG. 8 shows a flowchart of a method according to another embodiment of the present disclosure.

FIG. 8 shows a flowchart of a method 800 according to another embodiment of the present disclosure, which may be performed by an apparatus implemented in or as or communicatively coupled to a first wearable device or any other entity having similar functionality. As such, the first wearable device may provide means or module for accomplishing various parts of the method 800 as well as means for accomplishing other processes in conjunction with other components. For some parts which have been described in the above embodiments, detailed description thereof is omitted here for brevity.

At block 802, the first wearable device may receive a message for guiding a user from a terminal device of the user. For example, the communication device such as terminal device may send the message for guiding the user at block 102 of FIG. 1, and then the first wearable device may receive the message for guiding the user. In an embodiment, an object is determined to be dangerous to the user of the terminal device based at least on a current position of the object as described above.

At block 804, the first wearable device may guide the user based on the message. For example, the first wearable device may provide various signals (such as vibration signal, video signal, audio signal, etc. and/or combination thereof) to the user of the first wearable device to guide the user.

Figure 9:
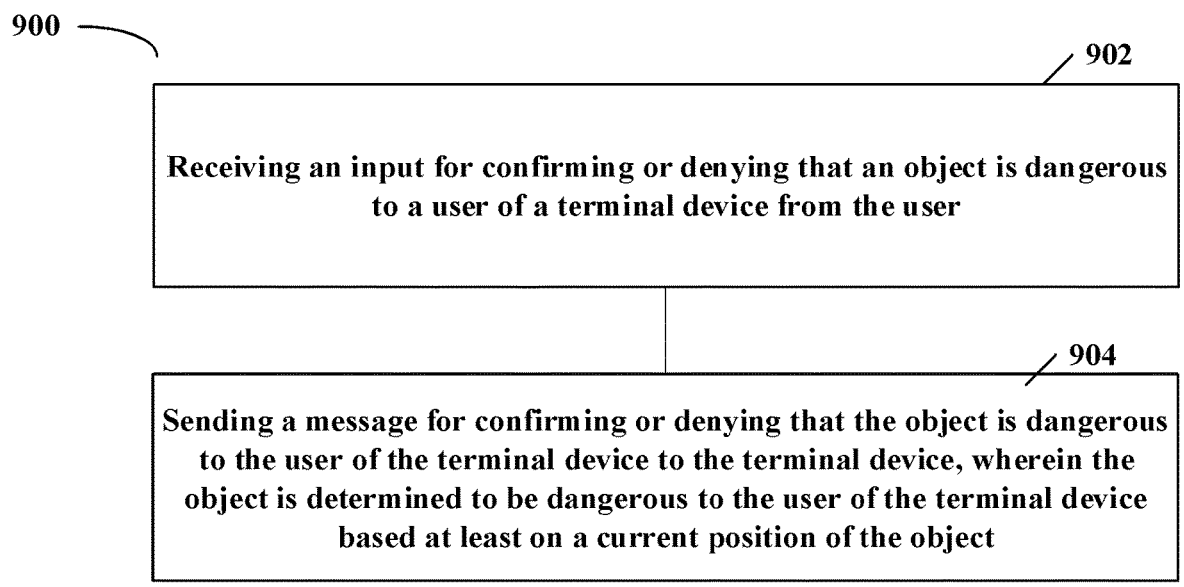
FIG. 9 shows a flowchart of a method according to another embodiment of the present disclosure.

FIG. 9 shows a flowchart of a method 900 according to another embodiment of the present disclosure, which may be performed by an apparatus implemented in or as or communicatively coupled to a second wearable device or any other entity having similar functionality. As such, the second wearable device may provide means or module for accomplishing various parts of the method 900 as well as means for accomplishing other processes in conjunction with other components. For some parts which have been described in the above embodiments, detailed description thereof is omitted here for brevity.

At block 902, the second wearable device may receive an input for confirming or denying that an object is dangerous to a user of a terminal device from the user. The object is determined to be dangerous to the user of the terminal device based at least on a current position of the object. For example, after the first wearable device receives the message for guiding the user from the terminal device of the user and guides the user based on the message, the user may confirm or deny whether the object is dangerous to the user of the terminal device.

At block 904, the second wearable device may send a message for confirming or denying that the object is dangerous to the user of the terminal device to the terminal device. The terminal device may send the message for confirming or denying that the object is dangerous to the user of the terminal device to the server as described above.

Figure 10:
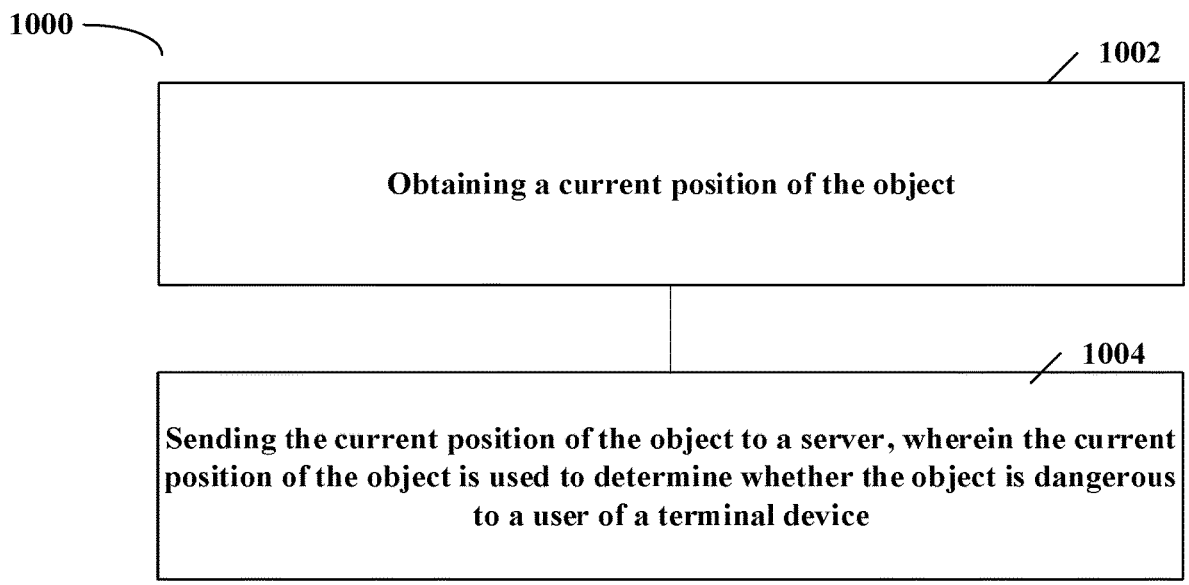
FIG. 10 shows a flowchart of a method according to another embodiment of the present disclosure.

FIG. 10 shows a flowchart of a method 1000 according to another embodiment of the present disclosure, which may be performed by an apparatus implemented in or as or communicatively coupled to an object or any other entity having similar functionality. As such, the object may provide means or module for accomplishing various parts of the method 1000 as well as means for accomplishing other processes in conjunction with other components. For some parts which have been described in the above embodiments, detailed description thereof is omitted here for brevity.

At block 1002, the object may obtain a current position of the object. For example, the object may obtain the current position of the object by using various positioning techniques.

At block 1004, the object may send the current position of the object to the server. For example, the object may send the current position of the object to the server in various ways such as periodically and/or in response to a request from the communication device and/or when there is a change of the current position. In an embodiment, the current position of the object may be used to determine whether the object is dangerous to a user of a terminal device as described above.

Figure 11:
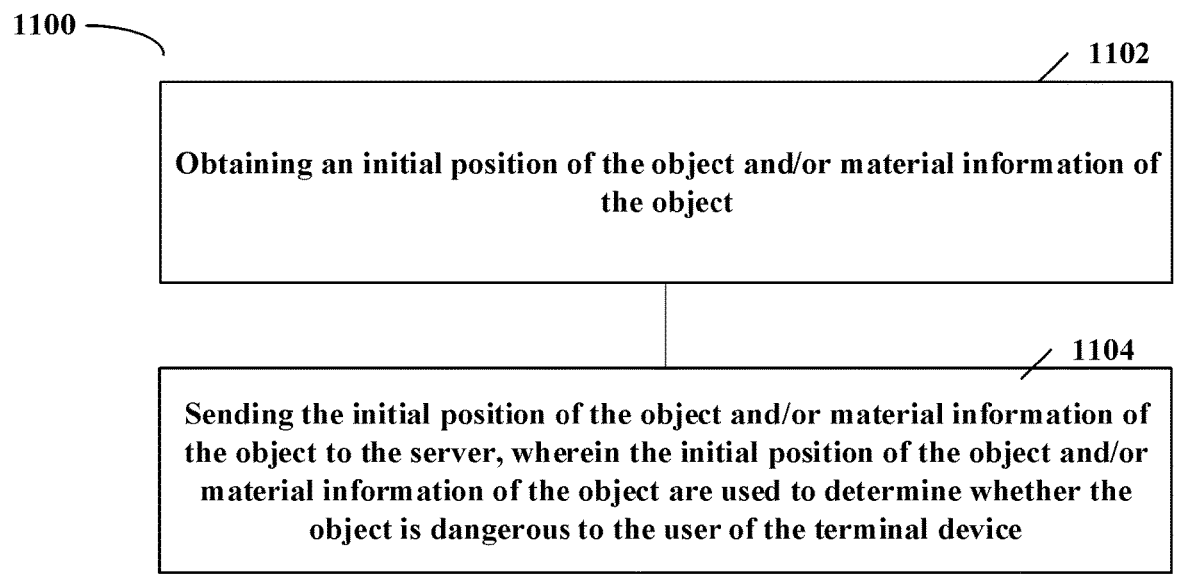
FIG. 11 shows a flowchart of a method according to another embodiment of the present disclosure.

FIG. 11 shows a flowchart of a method 1100 according to another embodiment of the present disclosure, which may be performed by an apparatus implemented in or as or communicatively coupled to an object or any other entity having similar functionality. As such, the object may provide means or module for accomplishing various parts of the method 1100 as well as means for accomplishing other processes in conjunction with other components. For some parts which have been described in the above embodiments, detailed description thereof is omitted here for brevity.

At block 1102, the object may obtain an initial position of the object and/or material information of the object. For example, the object may obtain the initial position of the object by using various positioning techniques. In addition, the initial position of the object and/or material information of the object may be preconfigured in the IoT device of the object.

At block 1104, the object may send the initial position of the object and/or material information of the object to the server. For example, the object may send the current position of the object and/or material information of the object to the server when the object is installed and/or in response to a request from the communication device. In an embodiment, the initial position of the object and/or material information of the object may be used to determine whether the object is dangerous to a user of a terminal device as described above.

Figure 12:
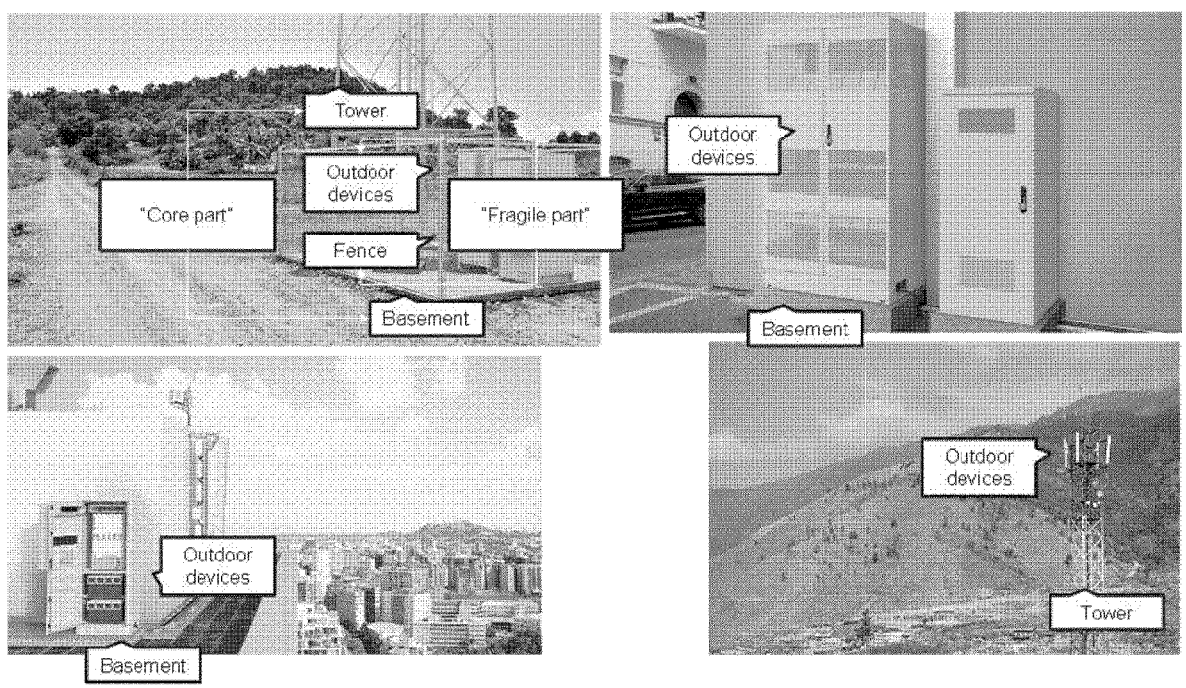
FIG. 12 shows some examples of the object according to an embodiment of the disclosure.

FIG. 12 shows some examples of the object according to an embodiment of the disclosure. In this embodiment, the object is the communication infrastructure having built-in NB-IoT device. An example of how the infrastructure is setup and send messages to the server may be as below. For example, one spare part that mostly won't be moved (named "core part") may be selected for example by the owner of the infrastructure, and after the construction of the infrastructure, the core part may send below information to the server: its absolute position (e.g., obtained from Global Position System (GPS)) and its geometrical dimensions. All other spare parts may be setup with the relative position with the "core part" as well as their geometrical dimensions with their unique identifiers (UIDs). All timers built in the spare parts may be synced to the clock in the server.

When there's any change which may cause the displacement, at least one consequence below may be happened:
    If the "core part" is displacement, which means the fundamental of this infrastructure is damaged or destroyed. A special message may be sent to the server to notify the maintenance team as well as notify the user nearby to keep away.
    If any other spare part is displacement, below information may be tracked and sent to the server:
        Which spare part is displaced, the unique ID (UID)
        Its displaced position
        A material of the displaced spare part
    Then when the user is approaching to it, the wearable device of the user will send him/her signals to be caution, and then when this user is passing it, he/she can confirm to this danger (displacement) by using the wearable device to send messages to the server. If the server has collected a certain amount of the same messages from the same place, then it will mark it as "identified danger".

Enhanced infrastructure setup principal may be as following:
    selecting one spare part as "core part", e.g., the basement of an outdoor electronic device. The "core part" can be the concrete basement or the tower, as they may be hardly to be moved. The "core part" may have the following built-in devices:
        GPS sensor—Report the position of the core part, as the core part is hard to be moved, the position of the core part may be almost always the initial position. Thus, when the core part is reporting that the position of the core part is changed, the core part is most probably suffered damage or even destroyed. In an embodiment, the core part may report its position periodically such as once a day.

An NB-IoT built-in device that can send messages including the occupied areas, the maintenance owner's contacting method, the dangerous severity to the server.

selecting other parts, especially the part that may be subjected to move, destroy or displacement as "fragile part". The "fragile part" may be the outdoor device as shown in FIG. 12. The "fragile part" may have the following built-in devices:

An NB-IoT built-in device that records the initial relative position that may be referred from the absolute position of its "core part".

A gyro attached with a timer that records the trace of movement so that by calculation, it can deduce the current position.

When design these infrastructures, the designer may define the following items: which part is the "core part" and the relative position of all "fragile parts". In this way, if the "fragile parts" are moved, it can deduce where are the new positions of the "fragile parts" and then it is possible to remind the people walked by. The vulnerability of each "fragile parts" can be determined by the material of each "fragile parts".

Besides these enhanced infrastructures, the embodiments of the disclosure can also be extended to natural stuffs and other fundamental material that may cause hurt to people. For example, the misallocated manhole cover that people may fall in may be dangerous for anyone. The drainage ditch that people may fall down may be dangerous for anyone, especially for blinds, kids and elders. The misaligned bricks that people may fall down may be dangerous if heavy snow covers them. Road section under construction that people may hurt if carelessly may be dangerous for anyone. Old trees that may fall after heavy rains may be dangerous for anyone and cars parked nearby. Car owners may also receive messages to remind them move the car to a more safety parking lot.

Infrastructures along the road may have at least one built-in NB-IoT device to indicate their initial positions (relative and/or absolute) and/or current positions (relative and/or absolute). By comparing the initial positions and the current positions, the communication device (such as the server or the terminal device) may know whether the infrastructure is properly placing, if not, then the first wearable device such as vibrator may provide a corresponding signal to the user to highlight the potential risk. By calculating the current positions, the communication device (such as the server or the terminal device) may cause the user to know the infrastructures' places for example when the road lamp is dim, the road is snow covered or the user has poor eyesight, etc.

In an embodiment, a gyro and a NB-IoT device may be built-in for each object such as infrastructures.

Figure 13:
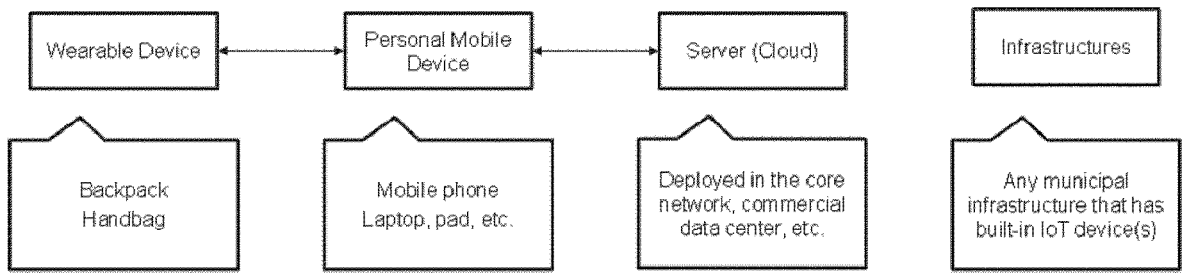
FIG. 13 shows an example of communication architecture according to an embodiment of the disclosure.

FIG. 13 shows an example of communication architecture according to an embodiment of the disclosure. Software architectural and algorithm implementation may be as following. The navigation function can be implemented by the wearable device such as vibrators planted in the object such as in different belts of backpack or the belt and the back side of a handbag. The software may run in the user's personal mobile device so that it is easily connected with wearable devices (such as the first and/or second wearable device) via various communication techniques such as Bluetooth connection, etc. Each infrastructure such as municipal infrastructure may setup a network to record all materials' relative position.

In an embodiment, each infrastructure material's relative position can be calculated by knowing:

Original position $P_O$ (the initial position—the position that the material should be)

Acceleration a and time t

Then the current position $P_c$ can be calculated:

$P_c(x,y,z)=P_O(x,y,z)+f(v_0,a,t)$ where $v_0=0$ $v_0$ is the original velocity that should be always 0 as it is a fixed infrastructure.

By knowing $v_0$, a and t, it can know the position delta value, so the current position can be calculated.

All relative position can be converted to absolute position.

When the acceleration (a) had significant changes in a limited time, e.g.: when a spare part is falling from higher position to the ground, it might be already damaged. In such situation, this solution will set the corresponding area as risky region and inform the maintenance team to repair the damaged spare part immediately. How to define the level of significance of the acceleration (a) and the length of limited time can be based on the material of the spare part.

Figure 14:
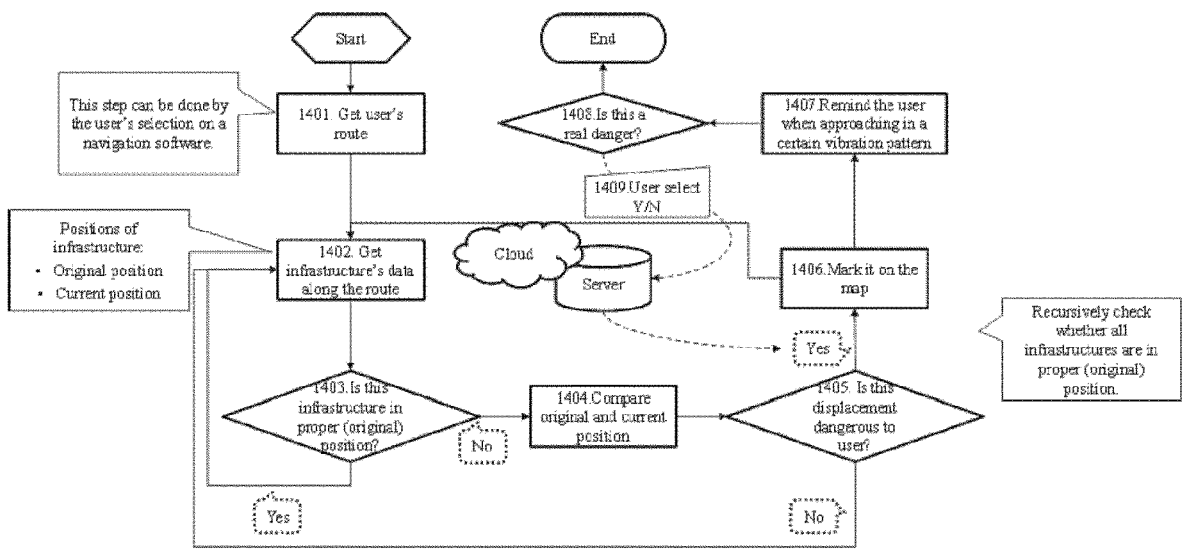
FIG. 14 shows an example of navigation workflow according to an embodiment of the disclosure.

FIG. 14 shows an example of navigation workflow according to an embodiment of the disclosure. For some parts which have been described in the above embodiments, detailed description thereof is omitted here for brevity.

At step 1401, the communication device such as the server or the terminal device may get the user's route. For example, this step can be done by the user's selection on a navigation software.

At step 1402, the communication device may get infrastructure's data along the route. The infrastructure's data may include the original position and the current position of the infrastructure.

At step 1403, the communication device may determine whether the infrastructure is in a proper (original or initial) position. When the infrastructure is not in the proper (original or initial) position, the workflow may proceed to step 1404, otherwise return to step 1402 to get another infrastructure's data along the route.

At step 1404, the communication device may compare the original position and the current position.

At step 1405, the communication device may determine whether the displacement between the original position and the current position is dangerous to the user. When the displacement between the original position and the current position is dangerous to the user, the workflow may proceed to step 1406, otherwise return to step 1402 to get another infrastructure's data along the route.

At step 1406, the communication device may mark the danger on the navigation map.

At step 1407, the communication device may remind the user when the user is approaching the object in a certain signal pattern such as vibration pattern.

At step 1408, the user may determine whether it is a real danger.

At step 1409, the user may select "yes" or "no" based on the user's determination. This information may be sent to the server (such as a cloud server). For example, when the server collected a certain amount of the same information from a same place, then it will mark it as "identified danger" or false alarm.

Figure 15:
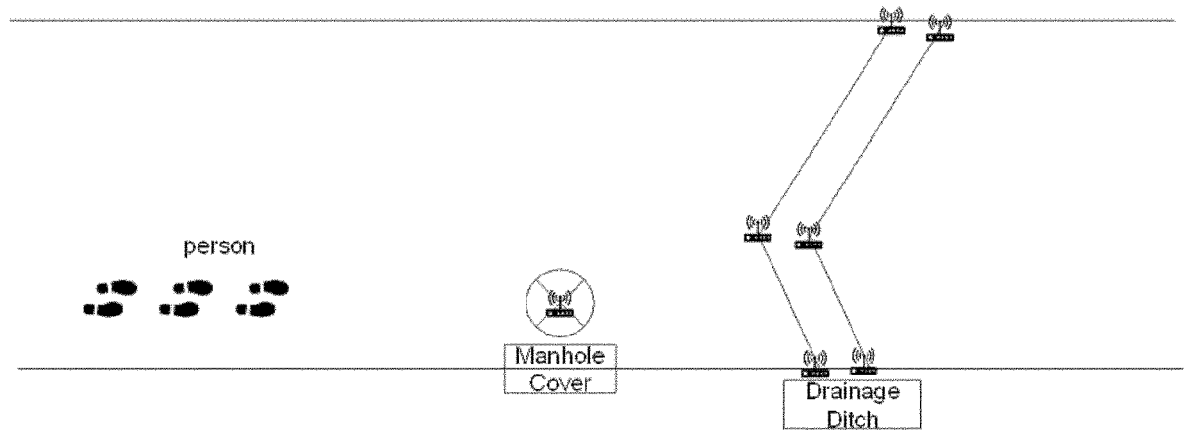
FIGS. 15-17 show some examples of avoid potential danger according to some embodiments of the disclosure.
Figure 16:
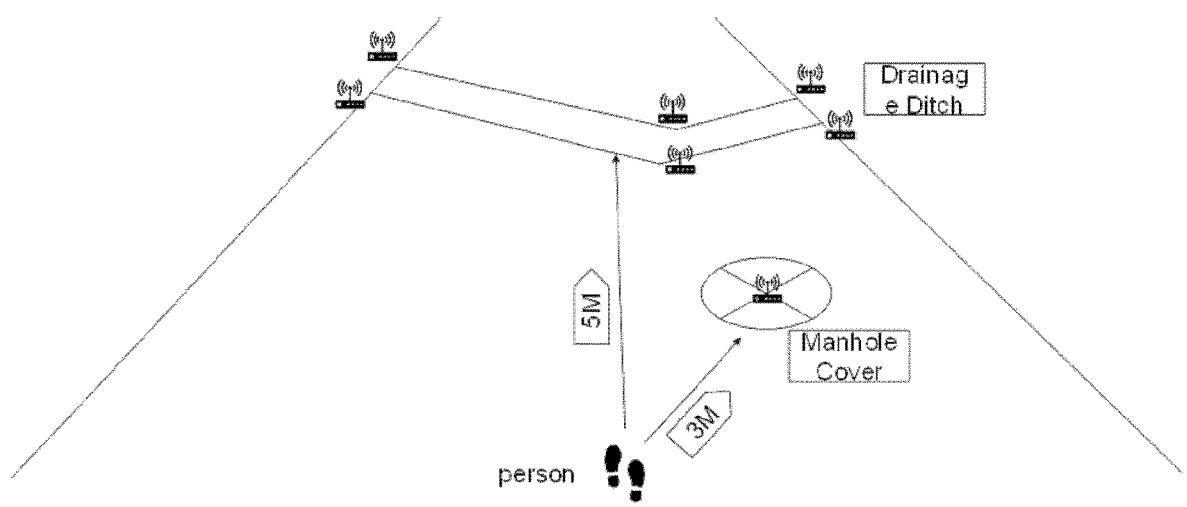
Figure 17:
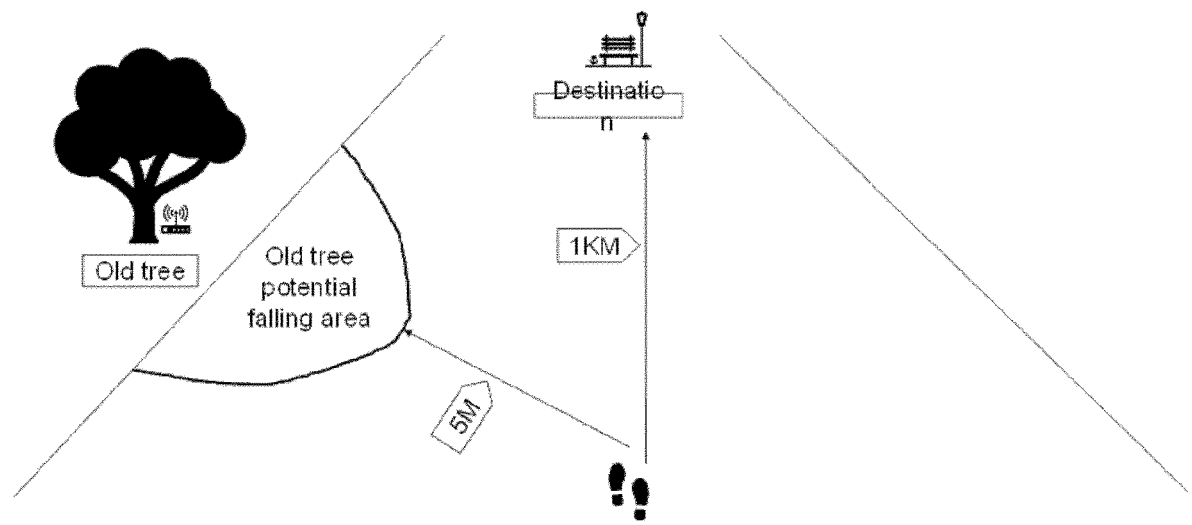

FIGS. 15-17 show some examples of avoiding potential danger according to some embodiments of the disclosure. For some parts which have been described in the above embodiments, detailed description thereof is omitted here for brevity. These embodiments illustrate how to prevent a person from dangers.

As shown in FIG. 15, there is a drainage ditch on the road that can be divided into N sections of strait line, in this example, taking two sections for simplicity, i.e., the "upper" section and "lower" section. There may be at least (2*N−1)*2 sensors attached along each ends of this drainage ditch so that the entire shape of the drainage ditch can be expressed in geometry terminology. Each sensor may send at least relative positions of the sensors towards the person to the person's terminal device within a certain distant near to the drainage ditch, e.g., 10 meters at night and 5 meters in daylight. The relative positions of the sensors towards the person can be provided to the person in various ways as described above, such as displayed in the person's wearable device such as VR glasses dynamically or mobile devices as illustrated in FIG. 16 (person's view). In this way, it is helpful to people walking along the street when there's snows cover on the drainage ditch.

In addition, there is a manhole cover as shown in FIGS. 15-16. There may be a sensor installed in the geometry center of the manhole cover and the sensor may send at least the relative position of the sensor towards the person and the geometer shape of the manhole cover to the person's terminal device within a certain distant near to the drainage ditch, e.g., 10 meters at night and 5 meters in daylight. The relative position of the sensor towards the person can be provided to the person in various ways as described above, such as displayed in the person's wearable device such as VR glasses dynamically or mobile devices as illustrated in FIG. 16 (person's view). The user who carries with the wearable device such as backpack or handbag which has sensors built in can easily get the relative positions of these dangers. Moreover, the misaligned bricks, the road section under constructions can also be processed like this way.

FIG. 17 shows how to avoid the danger of old trees. Some old trees may be leaving over hundred years, and they might fall due to various reasons such as heavy rain, strong wind, heavy snow, etc. Based on the NB-IoT devices attached on the old trees, the person nearby the old trees may be prompted to be cautions.

In an embodiment, a gyro (or a pressure sensitive sensor) and a vibrator may be installed on each belt of a backpack or on the belt and the back side of a handbag. Then the user can be informed and guided by the vibrator and feedback the backpack or handbag by tactile inputs.

In an embodiment, the vibration and/or tactile input patterns can be customized or use common configurations. In addition, the most frequent defined and/or used customized vibration and/or tactile input patterns can be analyzed and recommend to other users.

Embodiments herein afford many advantages, of which a non-exhaustive list of examples follows. Some embodiments herein may bring much convenience when the user is travelling (especially by foot) in tough areas, under cold seasons or in bad weathers. Some embodiments herein may avoid the user to be exposed to dangers. In some embodiments herein, the user can also feedback his/her observations to the communication device such as the server so that other people could also get benefits. In some embodiments herein, the hardware implementation for individual people is cheap, for example, the wearable device can be built-in almost all existing backpacks and handbags, the user won't feel a big change to his/her habits, and the software can be upgraded via the user's mobile devices such as phones, so it is easy to launch in markets for customers. In some embodiments herein, when the wearable device such as bag is lost, the police may find the owner of the bag more easily by analyzing the route travelled and stored in the internal storage within the wearable device. In some embodiments herein, the user can just use the wearable device such as sensor (including gyro and pressure sensitive sensor) to input messages to the terminal device without carrying out it from a pocket or a bag. This brings much more convenience in bad weather such as cold, raining or snowing. In some embodiments herein, it can make the blind and dumb people to input messages. In some embodiments herein, the navigation can be run without a screen, for example just by vibrations, this is useful to save batteries as the existing navigation software is always the huge power consumer. In some embodiments herein, the NB-IoT devices are installed in at least one facility along a road, and it is possible to do navigations even if the road is snow-covered, especially when it is under construction and/or or ruined or suffered malicious destruction. In some embodiments herein, it can help blind and hearing impairment people to walk more safely along the road as a relevant cheap solution comparing with the VR (virtual reality) glasses or AR (augmented reality) glasses. In some embodiments herein, the VR or AR glasses can be an optional component which may bring more convenience user experience. In some embodiments herein, people may always carry a backpack or a handbag with the wearable device when they are outing, so it won't increase the user's load. The embodiments herein are not limited to the features and advantages mentioned above. A person skilled in the art will recognize additional features and advantages upon reading the following detailed description.

Figure 18:
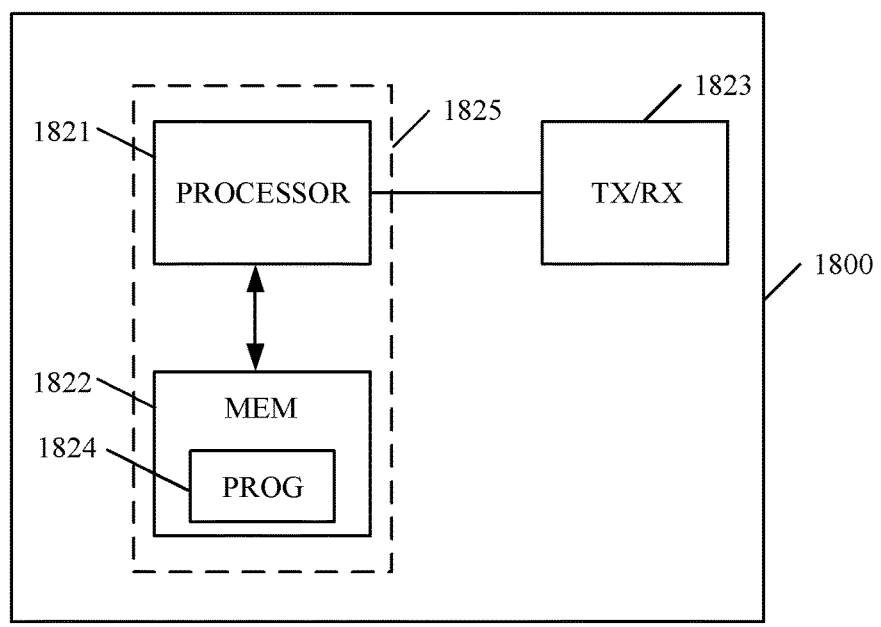
FIG. 18 is a block diagram showing an apparatus suitable for use in practicing some embodiments of the disclosure.

FIG. 18 is a block diagram showing an apparatus suitable for practicing some embodiments of the disclosure. For example, any one of the object, the communication device, the server, the first wearable device and the second wearable device described above may be implemented as or through the apparatus 1800.

The apparatus 1800 comprises at least one processor 1821, such as a DP, and at least one MEM 1822 coupled to the processor 1821. The apparatus 1820 may further comprise a transmitter TX and receiver RX 1823 coupled to the processor 1821. The MEM 1822 stores a PROG 1824. The PROG 1824 may include instructions that, when executed on the associated processor 1821, enable the apparatus 1820 to operate in accordance with the embodiments of the present disclosure. A combination of the at least one processor 1821 and the at least one MEM 1822 may form processing means 1825 adapted to implement various embodiments of the present disclosure.

Various embodiments of the present disclosure may be implemented by computer program executable by one or more of the processor 1821, software, firmware, hardware or in a combination thereof.

The MEM 1822 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1821 may be of any type suitable to the local technical environment, and may include one or more of general purpose computers, special purpose computers, microprocessors, digital signal processors DSPs and processors based on multicore processor architecture, as non-limiting examples.

In an embodiment where the apparatus is implemented as or at the communication device, the memory 1822 contains instructions executable by the processor 1821, whereby the communication device operates according to any one of the methods 100, 200, 300 and 400 as described in reference to FIGS. 1-4.

In an embodiment where the apparatus is implemented as or at the server, the memory 1822 contains instructions executable by the processor 1821, whereby the server operates according to any one of the methods 500, 600, and 700 as described in reference to FIGS. 5-7.

In an embodiment where the apparatus is implemented as or at the first wearable device, the memory 1822 contains instructions executable by the processor 1821, whereby the first wearable device operates according to the method 800 as described in reference to FIG. 8.

In an embodiment where the apparatus is implemented as or at the second wearable device, the memory 1822 contains instructions executable by the processor 1821, whereby the second wearable device operates according to the method 900 as described in reference to FIG. 9.

In an embodiment where the apparatus is implemented as or at the object, the memory 1822 contains instructions executable by the processor 1821, whereby the object operates according to any one of the methods 1000 and 1100 as described in reference to FIGS. 10-11.

Figure 19:
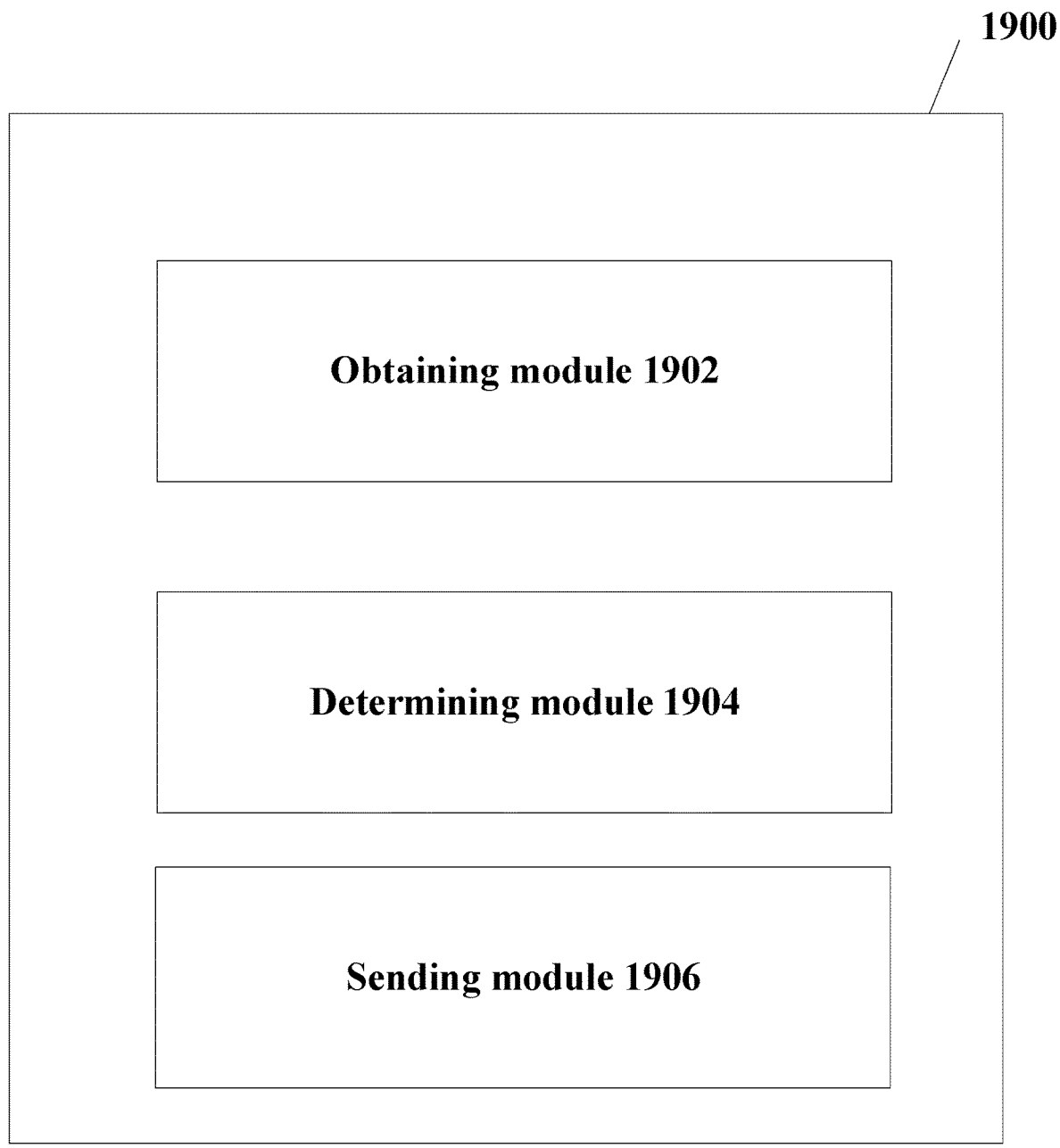
FIG. 19 is a block diagram showing a communication device according to an embodiment of the disclosure.

FIG. 19 is a block diagram showing a communication device according to an embodiment of the disclosure. As shown, the communication device 1900 comprises an obtaining module 1902, a determining module 1904 and a sending module 1906. The obtaining module 1902 may be configured to obtain a current position of an object. The determining module 1904 may be configured to determine whether the object is dangerous to a user of the terminal device based at least on the current position of the object. The sending module 1906 may be configured to, in response to a positive determination, send a message for guiding the user to a first wearable device of the user and/or a message for informing a maintainer about the dangerous object.

Figure 20:
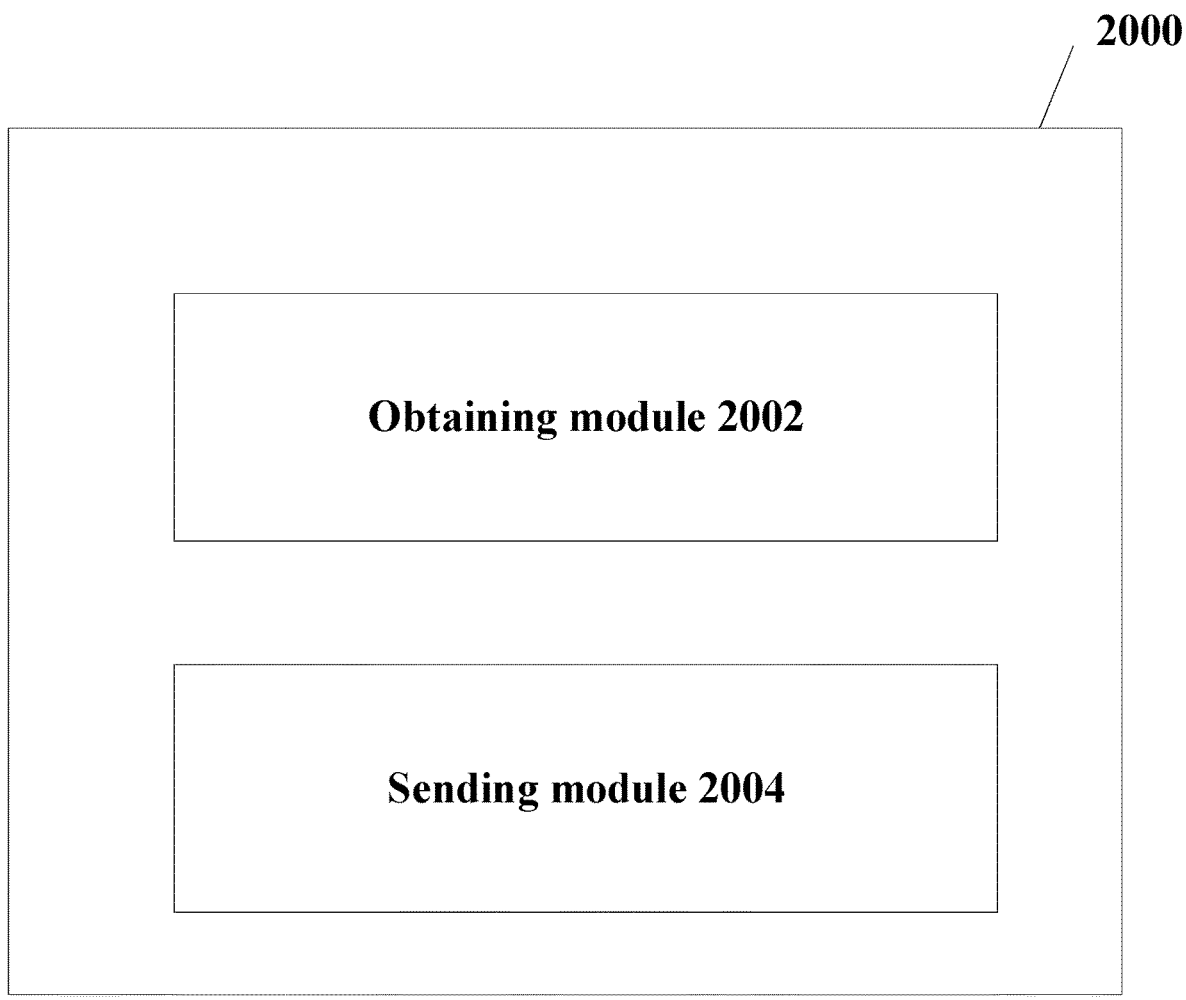
FIG. 20 is a block diagram showing a server according to an embodiment of the disclosure.

FIG. 20 is a block diagram showing a server according to an embodiment of the disclosure. As shown, the server 2000 comprises an obtaining module 2002 and a sending module 2004. The obtaining module 2002 may be configured to obtain a current position of an object. The sending module 2004 may be configured to send the current position of the object to a terminal device. The current position of the object is used to determine whether the object is dangerous to a user of the terminal device.

Figure 21:
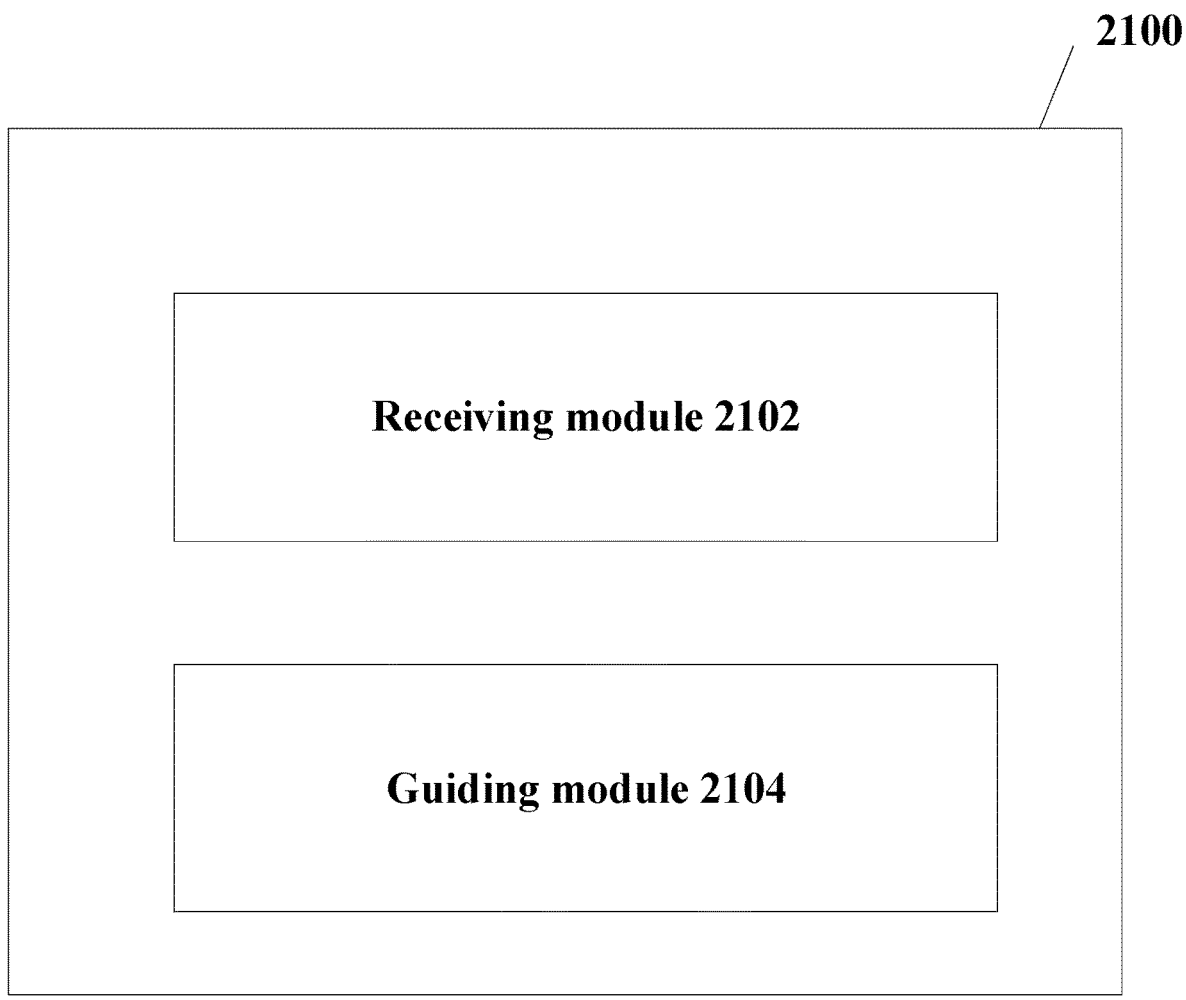
FIG. 21 is a block diagram showing a first wearable device according to an embodiment of the disclosure.

FIG. 21 is a block diagram showing a first wearable device according to an embodiment of the disclosure. As shown, the first wearable device 2100 comprises a receiving module 2102 and a guiding module 2104. The receiving module 2102 may be configured to receive a message for guiding a user from a terminal device of the user. The guiding module 2104 may be configured to guide the user based on the message. An object is determined to be dangerous to the user of the terminal device based at least on a current position of the object.

Figure 22:
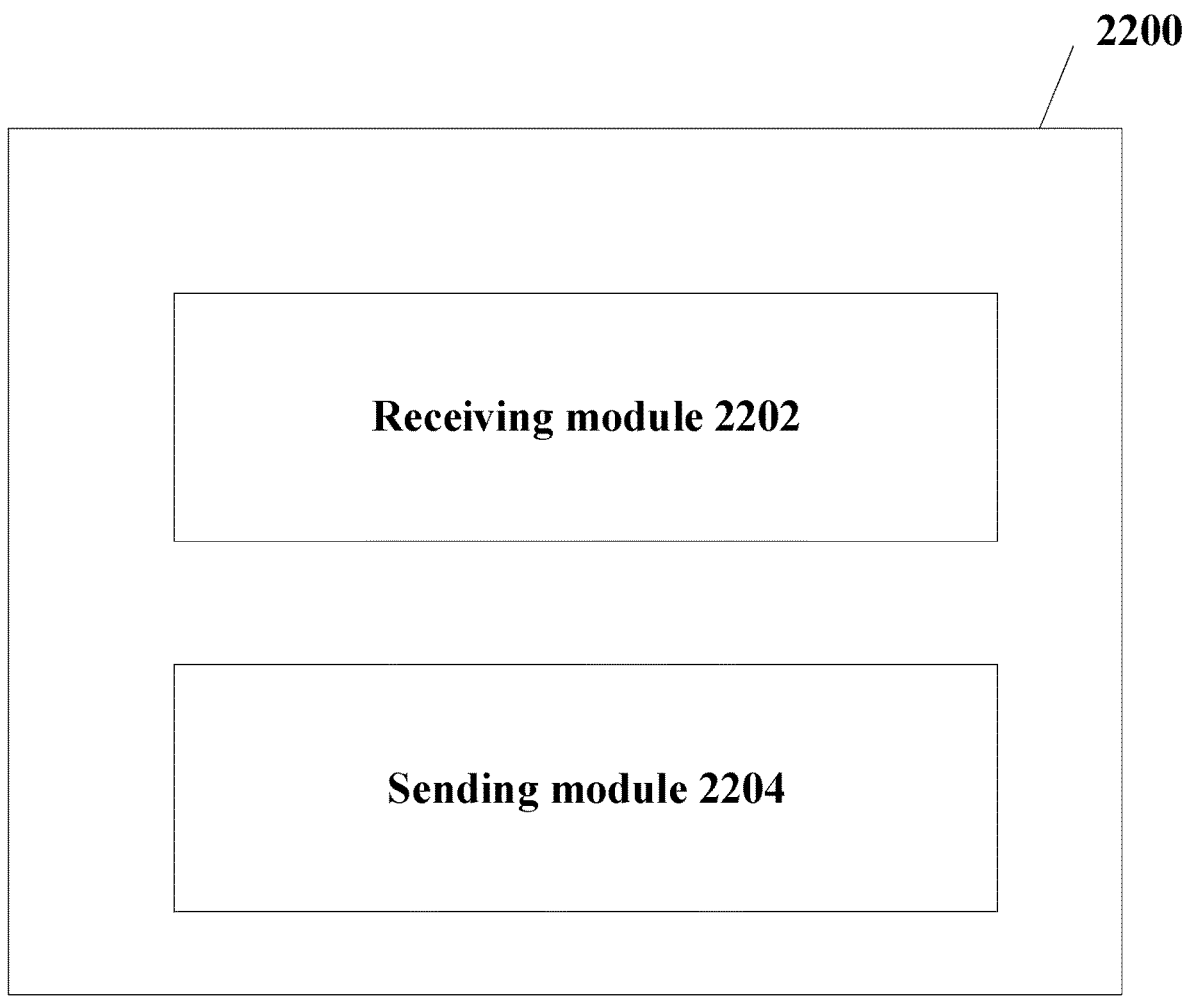
FIG. 22 is a block diagram showing a second wearable device according to an embodiment of the disclosure.

FIG. 22 is a block diagram showing a second wearable device according to an embodiment of the disclosure. As shown, the second wearable device 2200 comprises a receiving module 2202 and a sending module 2204. The receiving module 2102 may be configured to receive an input for confirming or denying that an object is dangerous to a user of a terminal device from the user. The sending module 2204 may be configured to send a message for confirming or denying that the object is dangerous to the user of the terminal device to the terminal device. An object is determined to be dangerous to the user of the terminal device based at least on a current position of the object.

Figure 23:
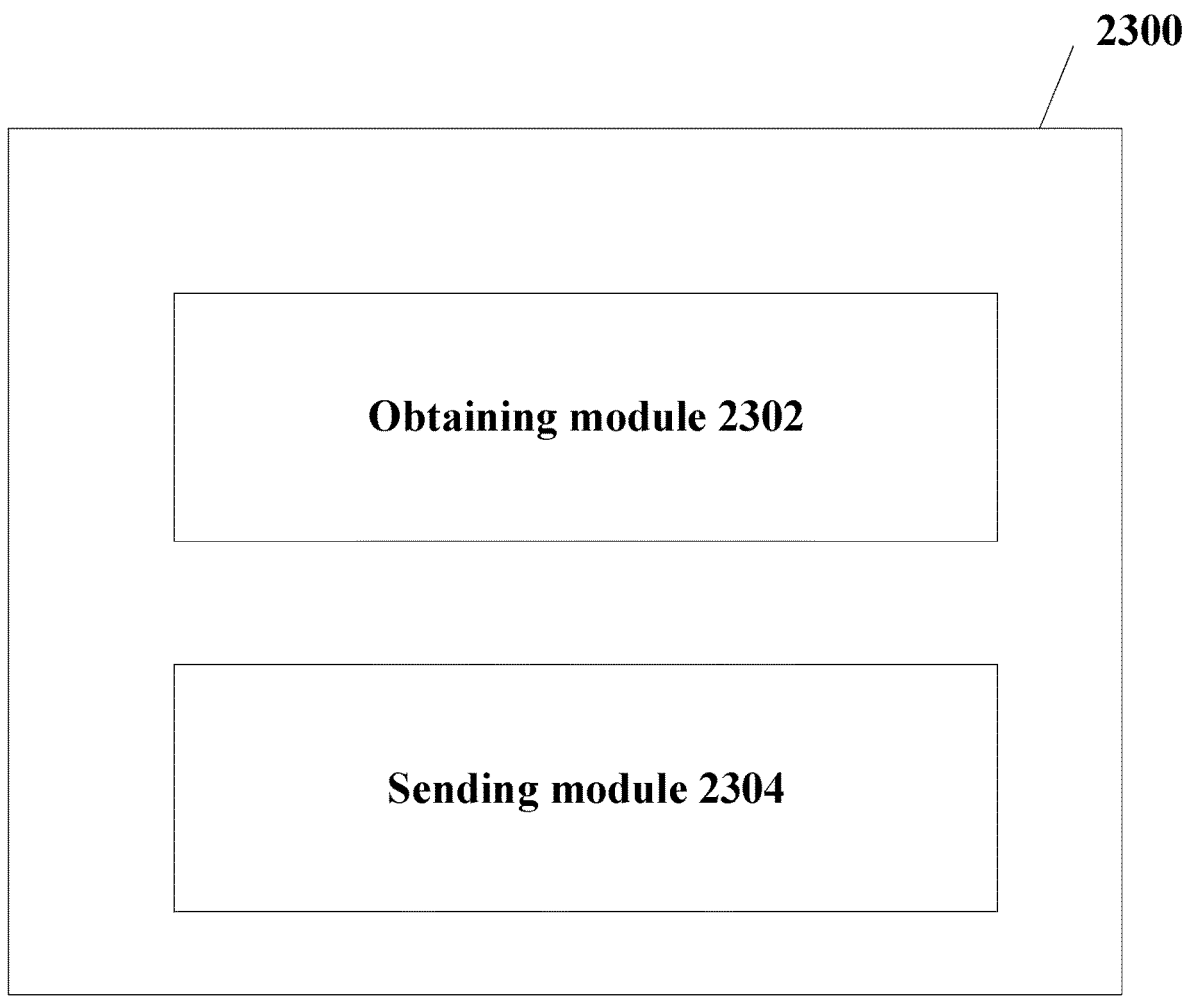
FIG. 23 is a block diagram showing an object according to an embodiment of the disclosure.

FIG. 23 is a block diagram showing an object according to an embodiment of the disclosure. As shown, the object 2300 comprises an obtaining module 2302 and a sending module 2304. The obtaining module 2302 may be configured to obtain a current position of the object. The sending module 2304 may be configured to send the current position of the object to a server. The current position of the object is used to determine whether the object is dangerous to a user of a terminal device.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a communication device, comprising:
   obtaining a current position and material information of an object that is disposed along a navigation route of a user, obtaining the current position and the material information of the object is in response to:
   sending, to a server or the object, a request to provide the current position of the object;
   receiving location information associated with the object from the server or the object;
   determining that a distance between the object and the communication device is less than a predefined threshold distance, wherein the predefined threshold distance is determined based at least on the material information of the object; and
   determining that the object is on a route of a navigation path of the communication device;
   determining whether the current position of the object is dangerous to a user of a terminal device based at least on the current position and the material information of the object, wherein the current position of the object is determined to be dangerous if the user reaches the object, the user would get injured, wherein determining whether the current position of the object is dangerous to the user of the terminal device is further based at least on determining that a displacement of the object, represented by a difference between an initial position of the object and the current position of the object, is larger than a predefined threshold; and
   in response to a positive determination:
   causing a first wearable device to generate a navigation instruction for avoiding the object;
   sending a guiding message to the first wearable device of the user, wherein the guiding message comprises the navigation instruction, wherein in response to sending the guiding message to the first wearable device of the user, the first wearable device is activated to trigger a specific vibration pattern that indicates a direction to avoid the object according to the navigation instruction;
   receiving a feedback message for confirming or denying that the current location of the object is dangerous to the user from a second wearable device;
   marking an indication of danger with respect to the object on a navigation map in response to the feedback message indicating a confirmation that the current location of the object is dangerous to the user; and
   sending the feedback message for confirming or denying that the current location of the object is dangerous to the user to the server, wherein in response to sending the feedback message to the server, a dangerous factor associated with the object is determined.

2. The method according to claim 1, further comprising:
   obtaining an initial position of the object and/or material information of the object,
   wherein determining whether the current position of the object is dangerous to the user of the terminal device is further based on the initial position and/or the material information of the object.

3. The method according to claim 2, wherein the initial position, the current position of the object and/or the material information of the object are obtained from a server.

4. The method according to claim 1, further comprising:
   obtaining the navigation route of the user, wherein the object is related to the navigation route.

5. The method according to claim 1, wherein sending the message for guiding the user is performed when a distance between the terminal device and the object is smaller than a threshold.

6. The method according to claim 1, wherein the second wearable device comprises at least one tactile input sensor.

7. The method according to claim 6, wherein the at least one tactile input sensor is built in a backpack or a handbag.

8. The method according to claim 1, wherein the first wearable device comprises at least one vibrator.

9. The method according to claim 8, wherein the at least one vibrator is built in a backpack or a handbag.

10. The method according to claim 1, wherein the object has at least one built-in Internet of things, IoT, device.

11. The method according to claim 1, wherein the object comprises at least one of a municipal infrastructure, a vehicle, a ship, a boat, a pedestrian, a drainage ditch, a manhole cover, or a road section under construction.

12. The method according to claim 1, wherein the communication device is a terminal device or a server.

13. A method performed by a server, comprising:
    obtaining a current position and material information of an object that is disposed along a navigation route of a user, obtaining the current position and material information of the object is in response to:
    receiving location information associated with the object from a terminal device or the object; and a determination that a distance between the object and a communication device is less than a predefined threshold distance, wherein the predefined threshold distance is determined based at least on the material information of the object; and a determination that the object is on a route of a navigation path of the communication device;

sending the current position of the object to the terminal device, wherein the current position of the object is used to determine whether the current position and the material information of the object is dangerous to a user of the terminal device, wherein a determination that the current position of the object is dangerous to the user of the terminal device is based at least on a determination that a displacement of the object, represented by a difference between an initial position of the object and the current position of the object, is larger than a predefined threshold, wherein the current position of the object is determined to be dangerous if the user reaches the object, the user would get injured;

wherein in response to the current position of the object to the terminal device:

a navigation instruction is generated to avoid the object;

a guiding message is sent to the terminal device, wherein the guiding message comprises the navigation instruction, wherein in response to the guiding message being sent to the terminal device, a first wearable device is activated to trigger a specific vibration pattern that indicates a direction to avoid the object according to the navigation instruction;

receiving a feedback message for confirming or denying that the current location of the object is dangerous to the user from a second wearable device, wherein an indication of danger with respect to the object on a navigation map is marked in response to the feedback message indicating a confirmation that the current location of the object is dangerous to the user, and determining a dangerous factor associated with the object based at least on the feedback message.

14. The method according to claim 13, further comprising:

obtaining an initial position of the object and/or material information of the object; and sending the initial position of the object and/or the material information of the object to the terminal device, wherein the initial position and/or the material information of the object are used to determine whether the current position of the object is dangerous to the user of the terminal device.

15. The method according to claim 14, wherein the initial position and the current position of the object are obtained from the object's Internet of things, IoT, device.

16. The method according to claim 13, wherein the object is related to a navigation route of the user.

17. The method according to claim 13, further comprising:

marking the object based on the feedback message.

18. The method according to claim 13, wherein the object has at least one built-in Internet of things, IoT, device.

19. A communication device, comprising:

a processor; and a memory coupled to the processor, said memory containing instructions executable by said processor, whereby said communication device is operative to:

obtain a current position and material information of an object that is disposed along a navigation route of a user, obtaining the current position and the material information of the object is in response to:

sending, to a server or the object, a request to provide the current position of the object;

receiving location information associated with the object from the server or the object;

determining that a distance between the object and the communication device is less than a predefined threshold distance, wherein the predefined threshold distance is determined based at least on the material information of the object; and determining that the object is on a route of a navigation path of the communication device determine whether the current position of the object is dangerous to a user of a terminal device based at least on the current position and the material information of the object, wherein the current position of the object is determined to be dangerous if the user reaches the object, the user would get injured, wherein said communication device is further operative to determine whether the current position of the object is dangerous to the user of the terminal device further based at least on a determination that a displacement of the object, represented by a difference between an initial position of the object and the current position of the object, is larger than a predefined threshold; and in response to a positive determination:

cause a first wearable device to generate a navigation instruction for avoiding the object;

send a guiding message to the first wearable device of the user, wherein the guiding message comprises the navigation instruction, wherein in response to the guiding message being sent to the first wearable device of the user, the first wearable device is activated to trigger a specific vibration pattern that indicates a direction to avoid the object according to the navigation instruction;

receive a feedback message for confirming or denying that the current location of the object is dangerous to the user from a second wearable device;

mark an indication of danger with respect to the object on a navigation map in response to the feedback message indicating a confirmation that the current location of the object is dangerous to the user; and send the feedback message for confirming or denying that the current location of the object is dangerous to the user to the server, wherein in response to sending the feedback message to the server, a dangerous factor associated with the object is determined.

\* \* \* \* \*